(12) United States Patent
Rosania et al.

(10) Patent No.: US 8,050,868 B2
(45) Date of Patent: Nov. 1, 2011

(54) METHODS FOR DETERMINING THE ORGANIZATION OF A CELLULAR COMPONENT OF INTEREST

(75) Inventors: Gustavo Rosania, Ann Arbor, MI (US); Paul Sammak, Pittsburgh, PA (US); Richard Rubin, Pittsburgh, PA (US)

(73) Assignee: Cellomics, Inc., Pittsburgh, PA (US)

( * ) Notice: Subject to any disclaimer, the term of this patent is extended or adjusted under 35 U.S.C. 154(b) by 1701 days.

(21) Appl. No.: 10/106,589

(22) Filed: Mar. 25, 2002

(65) Prior Publication Data

US 2003/0059093 A1    Mar. 27, 2003

Related U.S. Application Data

(60) Provisional application No. 60/278,920, filed on Mar. 26, 2001.

(51) Int. Cl.
*G06K 9/00* (2006.01)
*G01N 33/48* (2006.01)
*G01N 33/50* (2006.01)
(52) U.S. Cl. ............... 702/19; 382/132; 382/133
(58) Field of Classification Search ............ 702/19; 328/128
See application file for complete search history.

(56) References Cited

U.S. PATENT DOCUMENTS

| | | | |
|---|---|---|---|
| 4,727,365 | A | 2/1988 | Bunker et al. |
| 5,162,990 | A | 11/1992 | Odeyale et al. |
| 5,828,776 | A | 10/1998 | Lee et al. |
| 5,989,835 | A | 11/1999 | Dunlay et al. |
| 6,055,325 | A | 4/2000 | Garini et al. |
| 2004/0233461 | A1 * | 11/2004 | Armstrong et al. ........... 356/620 |

FOREIGN PATENT DOCUMENTS

| | | |
|---|---|---|
| WO | WO 98/38490 | 3/1998 |
| WO | WO 00/03246 | 1/2000 |
| WO | WO 00/17643 | 3/2000 |
| WO | WO 00/50872 | 8/2000 |
| WO | WO 01/42786 | 6/2001 |

OTHER PUBLICATIONS

Wahl et al. Association of cytoplasmic free Ca2+ gradients with subcellular organelles. Journal of Cellular Physiology. vol. 150, Issue 3 , pp. 593-609.*
Pitas et al Algorithms for Image Processing and Computer Vision. John Wille and Sons, 2000.*
John Russ The Image Processing Handbook; CRC; 4th edition, Jul. 26, 2002.*
Seul et al Practical Algorithms for Image Analysis with CD-ROM: Description, Examples, and Code. Cambridge University Press, 2000.*
Girod et al, Ed. Principles of 3d Image Analysis and Synthesis, Computers, 2000.*
Girod et al. Principles of 3D Image Analysis and Synthesis, Computers, 2000, pp. 80-82.*
Bootman et al. Current Biology 1996, vol. 6, No. 7:855-865.*
Kriegman et al. IEEE Transactions on pattern analysis and machine intelligence, 1990, vol. 12, 1127-1137.*
John Russ The Image Processing Handbook; CRC; 4th edition, Jul. 26, 2002, Chapter 7.*
Seul et al Practical Algorithms for Image Analysis with CD-ROM: Description, Examples, and Code. Cambridge University Press, 2000, Chapter 4.*
Girod et al, Ed. Principles of 3d Image Analysis and Synthesis, Computers, 2000, chapter 4.*
Kriegman et al. IEEE Transactions on Pattern Analysis and Machine Intelligence, vol. 12, No. 12, p. 1127-1137, Dec. 1990.*
Wahl et al. Association of cytoplasmic free Ca2+ gradients with subcellular organelles. Journal of Cellular Physiology. vol. 150, Issue 3, pp. 593-609, 1992.*
Alvarez, et al., (1999), European Journal of Cell Biology, vol. 78, pp. 1-14.
Baker, et al., (1995), Cytometry, vol. 19(2), pp. 134-145.
Boland, et al., (1999), Trends in Cell Biology, vol. 9(5), pp. 201-202.
Cassimeris, et al., (1988), Journal of Cell Biology, vol. 107, pp. 2223-2231.
DeBiasio, et al., (1996) Mol. Biol. Cell. 7:1259.
Drummond, et al., (2000), Current Biology, vol. 10, pp. 766-775.
Farkas et al. (1993) Ann. Rev. Physiol. 55:785.
Ferrier, et al., (1996), Cell Calcium, vol. 20(5), pp. 381-388.
Giuliano and Taylor (1995), Curr. Op. Cell Biol. 7:4.
Giuliano et al., (1995) Ann. Rev. Biophys. Biomol. Struct. 24:405.
Giuliano et al. (1990) in Optical Microscopy for Biology. pp. 543-557.
Goud, et al., (1999), Mol Hum Reprod, vol. 5(5), pp. 441-451.
Hahn et al (1992) Nature 359:736.
Hasezawa, et al., (2000), Plant Cell Physiol., vol. 41(2), pp. 244-250.
Heim and Tsien, (1996) Curr. Biol. 6:178.
Hiraoka, et al., (1991), Semin Cell Biology, vol. 2(3), pp. 153-165.
Hofer, et al., (1995), Faseb Journal, vol. 9(9), pp. 788-798.
Howell, et al., (2000), Journal of Cell Biology, vol. 150(6), pp. 1233-1250.
Malnic, et al., (2000), J. Membrane Biol.,vol. 178, pp. 115-125.
Mason et al., Quantitative Real-Time Imaging of Optical Probes in Living Cells Ed.: Mason, W.T., Academic Press, pp. 176-179, 1993.

(Continued)

*Primary Examiner* — Michael Borin
(74) *Attorney, Agent, or Firm* — McDonnell Boehnen Hulbert & Berghoff LLP

(57) ABSTRACT

The present invention provides automated methods and associated software for determining the organization of a component of interest in individual cells by determining the amount or distribution of the cellular component of interest as a function of position relative to a reference component in the individual cells.

42 Claims, 28 Drawing Sheets

OTHER PUBLICATIONS

Mayer, T.U., et a., (1999), Science, vol. 286(5441), pp. 971-974.
Mitchison, T.J., (1989), Journal of Cell Biology, vol. 109, pp. 637-652.
Panda, D., et al., (1998), Proc. Natl. Acad. Sci USA, vol. 95(16), pp. 9313-9318.
Ringel, I., et al., (1991), J. Natl. Cancer Inst., vol. 83(4), pp. 288-291.
Rizzuto, et al., (1998), Trends in Cell Biology, vol. 8, pp. 288-292.
Salmon, et al., (1984), Journal of Cell Biology, vol. 99, pp. 2165-2174.
Sammak, et al., (1988), Cell Motility and the Cytoskeleton, vol. 10, pp. 237-245.
Sammak, et al., (1988), Nature, vol. 332, pp. 724-726.
Sawin, et al., Biological Techniques, Chapter 31, pp. 405-419, 1993.
Schiff, P.B., et al., (1979), Nature, vol. 277(5698), pp. 665-667.
Terasaki, et al., (2000), Molecular Biology of the Cell, vol. 11, pp. 897-914.
Vorobjev, et al., (1999), Journal of Cell Science, vol. 112, pp. 2277-2289.
Waggoner et al. (1996) Hum. Pathol. 27:494.
Waterman-Storer, et al., (2000), Molecular Biology of the Cell, vol. 11, pp. 2471-2483.
Waterman-Sorer, et al., (1998), Mol Cell Biol, vol. 9(12), pp. 3263-3271.
Waterman-Sorer, et al., (1998), Current Biology, vol. 8, pp. 1227-1230.
Williams et al. "Introducing and Calibrating Fluorescent Probes in Cells and Organelles". In: Fluorescent and Luminescent Probes for Biological Activity, Ed.: Mason, W.T., Academic Press, pp. 320-333, 1993.
Xiang, et al., (2000), Current Biology, vol. 10(10), pp. 603-606.
Yvon, et al., (1999), Molecular Biology of the Cell, vol. 10, pp. 947-959.

* cited by examiner

E

F

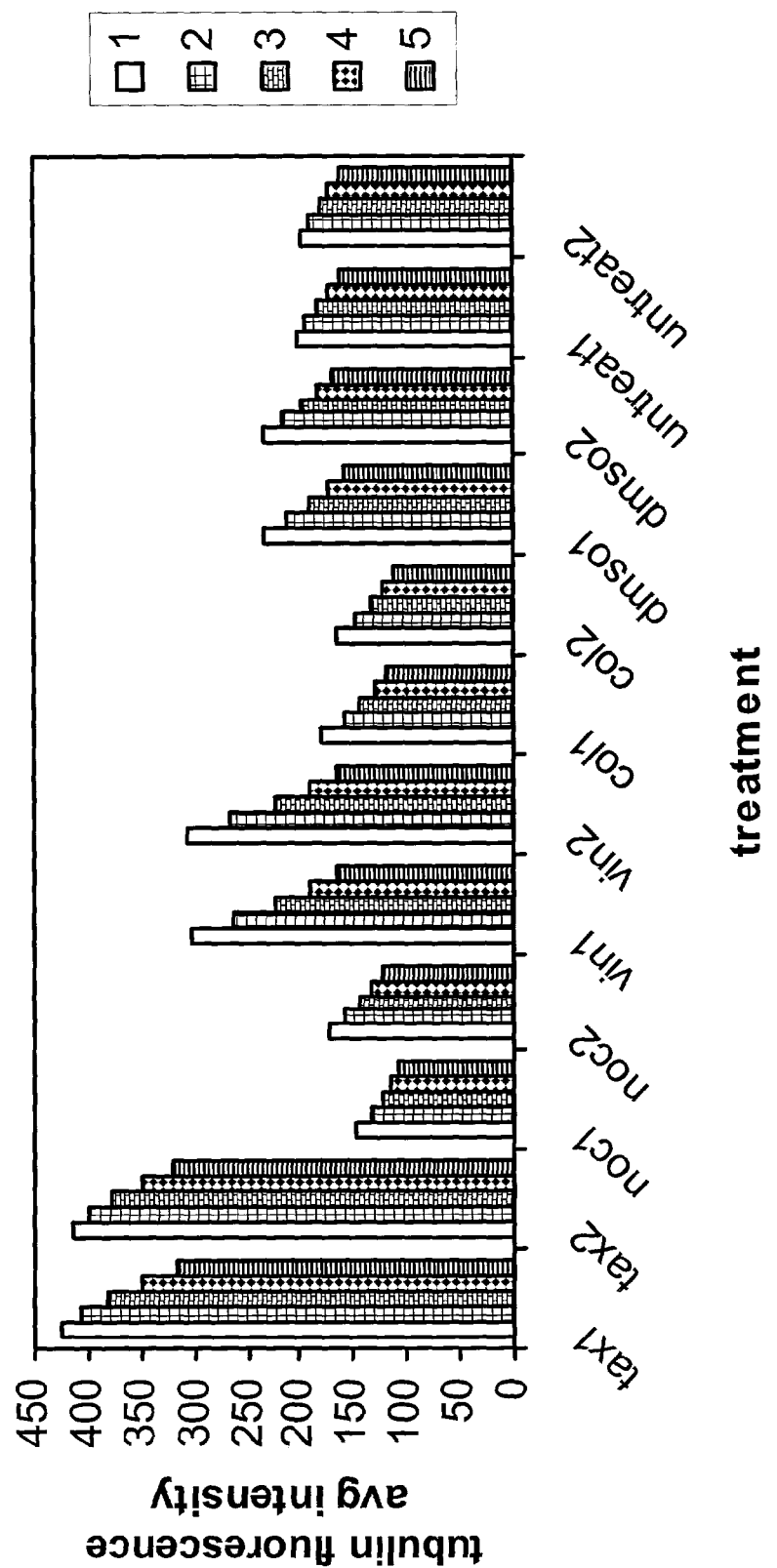

METHODS FOR DETERMINING THE ORGANIZATION OF A CELLULAR COMPONENT OF INTEREST

CROSS REFERENCE

This application claims priority to U.S. Provisional Application Ser. No. 60/278,920 filed Mar. 26, 2001

FIELD OF THE INVENTION

This invention is in the field of automated, cell-based screening and drug discovery.

BACKGROUND

Drug discovery is a long, multiple step process involving identification of specific disease targets, development of an assay based on a specific target, validation of the assay, optimization and automation of the assay to produce a screen, high throughput screening of compound libraries using the assay to identify "hits", hit validation and hit compound optimization. The output of this process is a lead compound that goes into pre-clinical and, if validated, eventually into clinical trials. In this process, the screening phase is distinct from the assay development phase, and involves testing compound efficacy in living biological systems.

Validation of genomic targets as points for therapeutic intervention using existing methods and protocols is a bottleneck in the drug discovery process due to the slow, manual methods employed, such as in vivo functional models, functional analysis of recombinant proteins, and stable cell line expression of candidate genes.

There is a need for cell screening and drug discovery tools that provide increased information handling capability. Bioinformatics has blossomed with the rapid development of DNA sequencing systems and the evolution of the genomics database. Genomics is beginning to play a critical role in the identification of potential new targets. Proteomics has become indispensable in relating structure and function of protein targets in order to predict drug interactions. The next level of biological complexity is the cell. Therefore, there is a need to acquire, manage and search multi-dimensional information from cells.

In contrast to high throughput screens, various high-content screens have been developed to address the need for more detailed information about the temporal-spatial dynamics of cell constituents and processes. High-content screens automate the extraction of multicolor fluorescence information derived from specific fluorescence-based reagents incorporated into cells (Giuliano and Taylor (1995), *Curr. Op. Cell Biol.* 7:4; Giuliano et al. (1995) *Ann. Rev. Biophys. Biomol. Struct.* 24:405). Cells are analyzed using an optical system that can measure spatial, as well as temporal dynamics. (Farkas et al. (1993) *Ann. Rev. Physiol.* 55:785; Giuliano et al. (1990) In *Optical Microscopy for Biology*. B. Herman and K. Jacobson (eds.), pp. 543-557. Wiley-Liss, New York; Hahn et al (1992) *Nature* 359:736; Waggoner et al. (1996) *Hum. Pathol.* 27:494).

High-content screens can be performed on either fixed cells, using fluorescently labeled antibodies, biological ligands, and/or nucleic acid hybridization probes, or live cells using multicolor fluorescent indicators and "biosensors." The choice of fixed or live cell screens depends on the specific cell-based assay required. The types of biochemical and molecular information now accessible through fluorescence-based reagents applied to cells include ion concentration, membrane potential, specific translocations, enzyme activities, and gene expression, as well as the presence, amounts and patterns of metabolites, proteins, lipids, carbohydrates, and nucleic acid sequences (DeBiasio et al., (1996) *Mol. Biol. Cell.* 7:1259;Giuliano et al., (1995) *Ann. Rev. Biophys. Biomol. Struct.* 24:405; Heim and Tsien, (1996) *Curr. Biol.* 6:178).

Despite the above, methods to improve the information accessible through high content screening are continually needed in the art.

SUMMARY OF THE INVENTION

The present invention provides automated methods and associated software for determining the organization of a component of interest in individual cells, comprising (a) providing cells that possess at least a first optically detectable reference component reporter molecule that identifies a reference component in the cells; and at least a first optically detectable cellular component reporter molecule that identifies a cellular component of interest; (b) obtaining optically detectable signals from the at least first reference component reporter molecule and the at least first cellular component reporter molecule in the individual cells; (c) automatically converting the optically detectable signals from the at least first optically detectable reference component reporter molecule into a digital reference component image; (d) automatically converting the optically detectable signals from the at least first optically detectable cellular component reporter molecule into a digital cellular component image; (e) automatically defining a reference component origin from the digital reference component image; (f) automatically defining a plurality of cellular domains relative to the reference component origin; and (g) automatically measuring from the digital cellular component image one or both of an amount or distribution of the cellular component of interest as a function of position in the plurality of cellular domains, wherein the measure indicates the organization of the cellular component of interest in the individual cells.

DETAILED DESCRIPTION OF THE INVENTION

Figure 1:
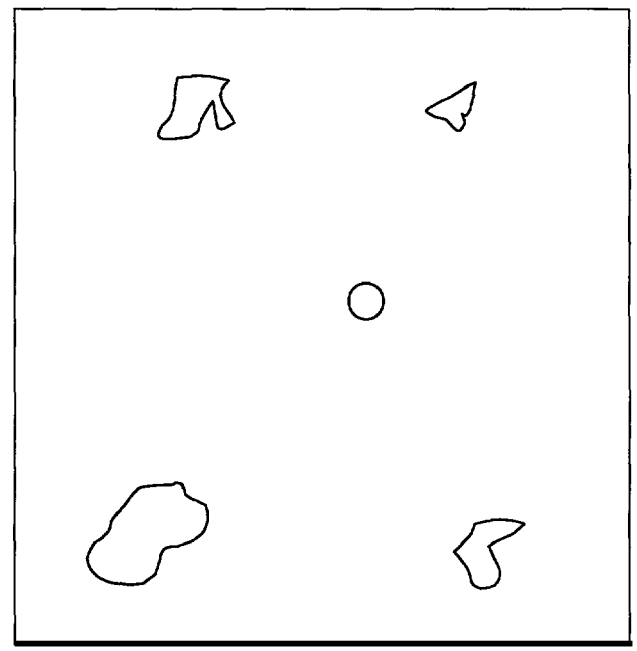
FIG. 1 shows a diagram of a general method for determining organization of cellular components in individual cells.
Figure 1:
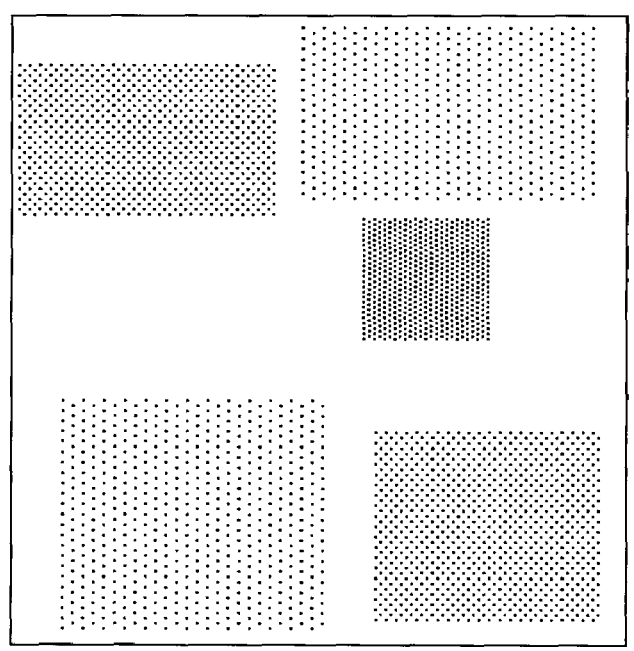
Figure 1:
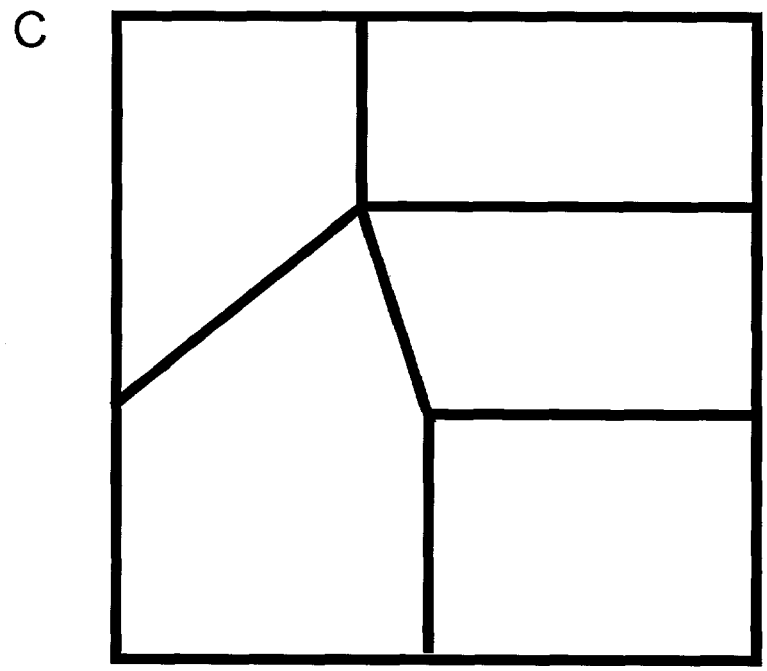
Figure 1:
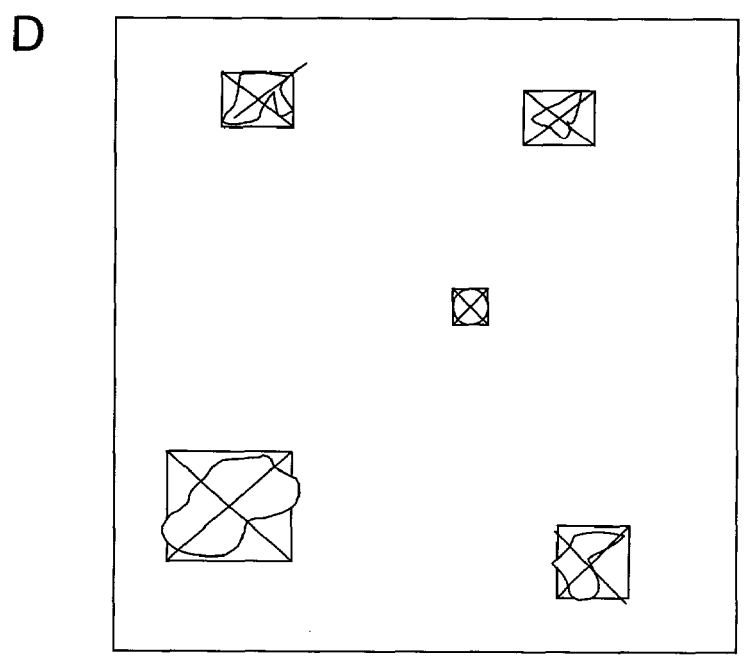
Figure 1:
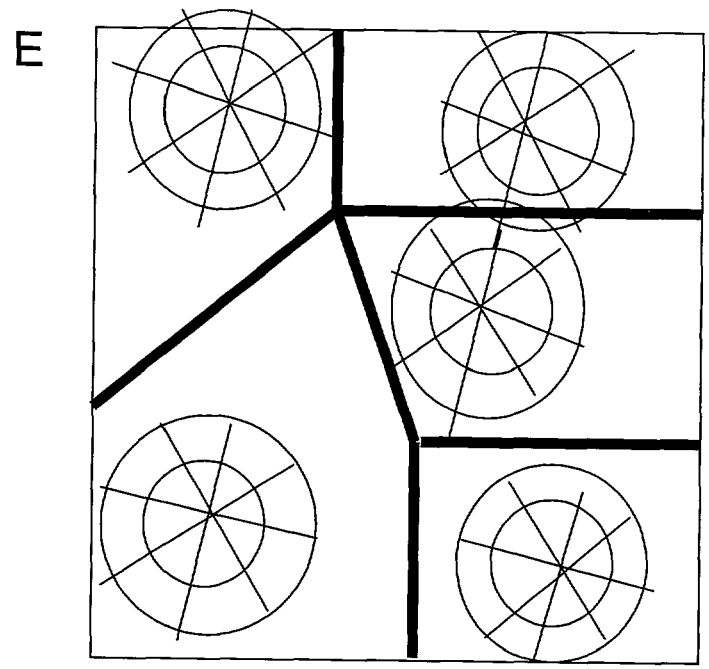
Figure 1:
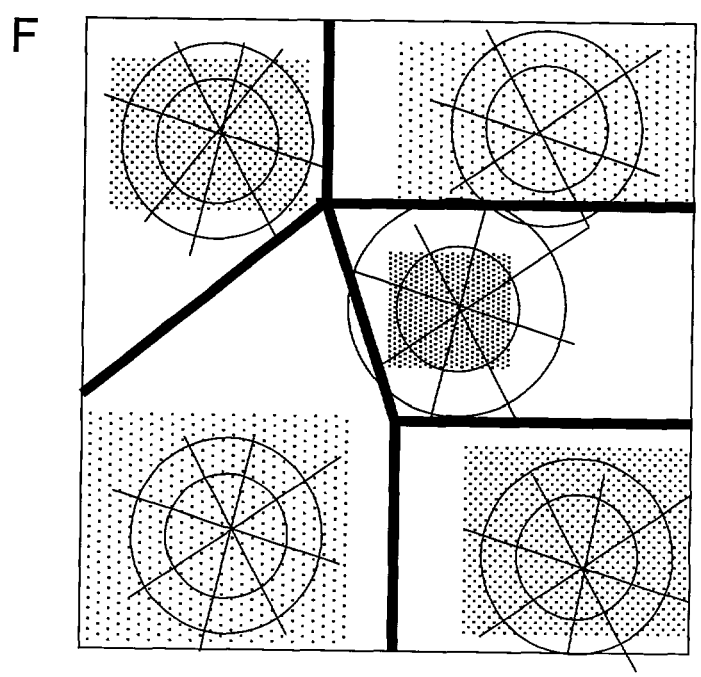

The present invention provides automated methods for determining the organization of a cellular component of interest in individual cells as a function of its position relative to a cellular reference component. In a preferred embodiment, the method comprises (a) providing cells that possess at least a first optically detectable reference component reporter molecule that identifies a reference component in the cells; and at least a first optically detectable cellular component reporter molecule that identifies a cellular component of interest; (b) obtaining optically detectable signals from the at least first reference component reporter molecule and the at least first cellular component reporter molecule in the individual cells; (c) automatically converting the optically detectable signals from the at least first optically detectable reference component reporter molecule into a digital reference component image; (d) automatically converting the optically detectable signals from the at least first optically detectable cellular component reporter molecule into a digital cellular component image; (e) automatically defining a reference component origin from the digital reference component image; (f) automatically defining a plurality of cellular domains relative to the reference component origin; and (g) automatically measuring from the digital cellular component image one or both of an amount or distribution of the cellular component of interest as a function of position in the plurality of cellular domains, wherein the measure indicates the organization of the cellular component of interest in the individual cells. In a preferred embodiment of the invention, the reference component image is used to define a plurality (two or more) of cellular domains relative to the one or more reference component origins.

The methods of the present invention provide improved informational content on the effects of a drug candidate on a cellular target of interest. As such, the methods provide physiologically relevant information that can improve the ability to identify drug candidates likely to possess a desired activity. For example, the present methods reduce the dimensionality of analysis of cellular organization from two-dimensions (X,Y position of the cellular component in cells) to one-dimension (cellular component within the domain as a function of position in the cellular domains). Additionally, the method provides a way to determine changes in spatial organization of a cellular component of interest in the absence of corresponding changes in the mass of the component.

As used herein, the term "organization" of the cellular component of interest means a measure of the amount and/or distribution of a cellular component of interest in individual cells. "Spatial" organization is measured in terms of how the amount and/or distribution of the cell component of interest within the one or more cellular domains changes as a function of domain position in multi-dimensional space. "Temporal" organization is measured in terms of how the amount and/or distribution of the cell component of interest within and/or between the one or more cellular domains changes in the temporal dimension.

The "cellular component of interest" can be any cellular component or group of components that an optically detectable reporter molecule can be used to identify, including but not limited the entire cell; proteins or peptides including but not limited to enzymes, integral membrane proteins, membrane associated proteins, and subcellular proteins; protein polymers including but not limited to microfilaments, intermediate filaments, microtubules, and other cytoskeletal components; organelles, including but not limited to mitochondria, Golgi apparatus, lysosomes, nuclei, endoplasmic reticulum, vacuoles, and plasma membranes; ionic condition, including but not limited to calcium concentration and pH; lipids; carbohydrates; and nucleic acids, including but not limited to chromosomes, individual genes, RNA transcripts, processed mRNA, introns, tRNA, and rRNA.

Similarly, the "reference component" can be any cellular component or group of components that an optically detectable reporter molecule can be used to identify, as discussed above, which is preferably different from the cellular component of interest, but can comprise the cellular component of interest.

As used herein an "optically detectable reporter molecule" is a reporter molecule that can emit, reflect, or absorb light, and includes, but is not limited to, fluorescent, luminescent, and chemiluminescent reporter molecules. In a preferred embodiment, fluorescent reporter molecules are used.

As used herein, the cells "possess" one or more optically detectable reporter molecules, meaning that the optically detectable reporter molecule may be expressed as an optically detectable reporter molecule by the cells (for example, by recombinant expression), added to the cells as an optically detectable reporter molecule (for example, fluorescent dyes), or labeled by contacting the cell with an optically detectable molecule (for example, a fluorescently labeled secondary antibody that binds to the reporter molecule, such as an unlabeled primary antibody).

The optically detectable signals can be obtained by standard methods, including but not limited to fluorescence microscopy, fluorescence plate readers, epifluorescence microscopy, confocal scanning microscopy, transmitted light microscopy and other signal detection methods known to those of skill in the art. In a preferred embodiment, fluorescence microscopy is used, as part of an automated cell screening system, which further comprises a fluorescence optical system with a stage adapted for holding cells and a means for moving the stage, a digital camera, a light source, and a computer for receiving and processing the digital data from the digital camera, as well as for storing and displaying the data.

As used herein, the term "image", when referring to a "reference component image" or a "cellular component of interest image" comprises a digital representation of the optically detectable signals from the reference component or cellular component of interest reporter molecules, respectively, and does not require a specific arrangement or display of the digital representation. In preferred embodiments, well known formats for such "images" are employed, including but not limited to .dib, .tiff, .jpg, and .bmp. In further preferred embodiments, the images are displayed to provide a visual representation of the image.

As used herein, an "amount" of the cellular component means any measurable quantity of the optically detectable signals from the cellular component reporter molecule(s), including but not limited to mass (defined herein as an aggregate of pixel intensities), concentration, intensity, number of objects ("spots"), length, size, area, and density.

As used herein a "distribution" of the cellular component means a mathematical relationship describing one or more properties of the cellular component of interest. The distribution may include "statistical" measurements including, but not limited to mean amount/unit area, standard deviation amount/unit area, skewness (slant of the distribution to high or low values), and kurtosis (the peak shape, concave or convex); and/or it can include "quality" measurements, including but not limited to heterogeneity, homogeneity, linearity, randomness, directionality, orientation, polarization, clustering, texture, and periodicity.

As used herein, "randomness" or "random distribution" means that the pixel intensity at any given position is independent of the pixel intensity at the neighboring positions.

As used herein, "homogeneity" or "homogeneous distribution" means that the histogram of the pixel intensity distribution within a given area is equal to the histogram of pixel intensity distribution in a neighboring area.

As used herein, "heterogeneity" or "heterogeneous distribution" means that the histogram of the pixel intensity distribution in neighboring areas are different.

As used herein "periodicity" or "periodic distribution" means that the histogram of the pixel intensity distribution over an area varies as an angular function (sine, cosine, tangent, inverse sine, inverse cosine, inverse tangent) of the position.

As used herein, "texture" or "textured distribution" means that the histogram of pixel intensity distribution varies as a function of the size of the area and the position of the area over which the pixel intensity distribution is measured.

As used herein, or "clustering" or "clustered distribution" means that the pixel intensity at a given position shows greater correlation with the pixel intensity at the neighboring positions than at more distant positions. Given a clustered distribution, the positions of pixels with intensity above a threshold are correlated in a non-random manner, and the correlation distance is a measure of the grain size of aggregated objects.

As used herein, "polarization" or "polarized distribution" means that the pixel intensity or the histogram of pixel intensity distribution increases or decreases along a particular vector.

As used herein, "linearity" or "linear distribution" means a heterogeneous pixel distribution that is constant along a particular line or vector.

As used herein, a "reference component origin" is a measurable feature of the reference component that is used to define the one or more cell domains. In the simplest case, the reference component is present as a single entity in the cell, such as the nucleus, wherein examples of the reference component origin include, but are not limited to, nuclear perimeter, perinuclear region, center of the nucleus, center of nuclear mass, or discrete sites in the nucleus, such as nucleoli. The reference component origin used in conjunction with a given cellular component of interest is preferably selected based on the simplicity it provides in mathematically representing the spatial organization of the cellular component as a function of domain position in the cell.

Figure 3:
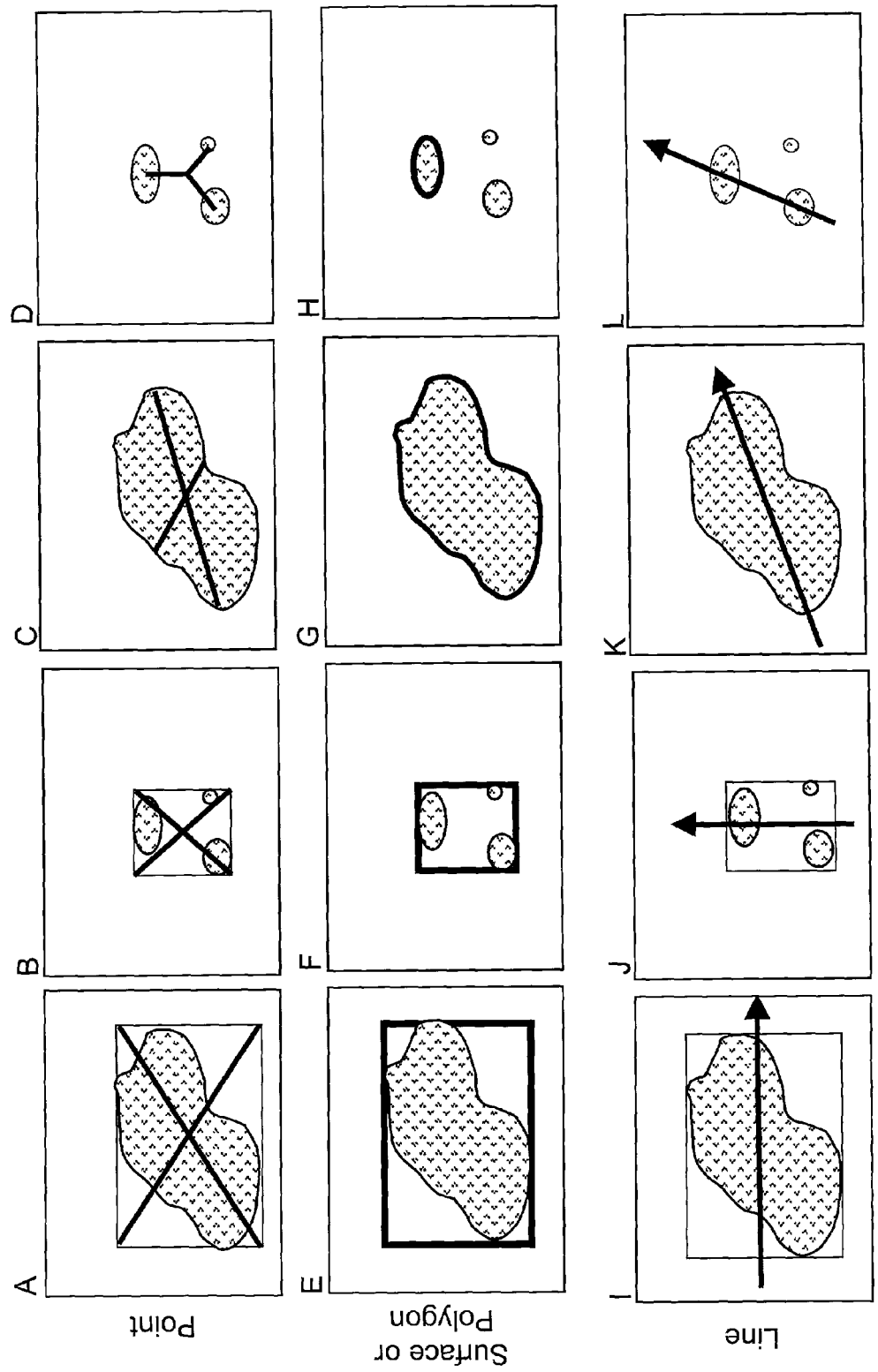
FIG. 3 shows different methods of identifying the reference component origin.

Referring to FIG. 3, the reference component origin can be a single point (3A-D), a surface/polygon (3E-H), or a line (3I-L) defined relative to the reference component(s). In the case of a reference component origin consisting of a single point, a bounding box can be drawn around the reference component(s), and then the reference component origin can be defined as the intersection of the diagonals within the bounding box (3A-B). By limiting the dimensions of the box and the minimal distance between boxes, only reference components that fit within a bounding box of a given size and are separated from adjacent reference components by a given distance are identified with a reference component origin. Alternatively, the longest and shortest diagonal across the reference component(s) can be drawn and the intersection (3C) can be defined as the reference component origin. In a further alternative of a reference component origin consisting of a single point, the centroid (center of mass) of the reference component(s) can be calculated (3D The centroid is the location whose x coordinate is the average of the x coordinates of all the pixels in the object, and whose y coordinate is the average of their y coordinates (or the pixel closest to that location).

A reference component origin consisting of a surface or polygon can be defined in various ways. For example, the reference component(s) can be circumscribed with a box (3E-F) or any other closed curve. Alternatively, a surface or polygon reference component origin can be directly determined by defining the perimeter of the reference component(s) (3G). When the reference components are disperse, a surface or polygon reference component origin can be defined by determining the perimeter of the largest identifiable reference component object (3H). In a further alternative, sequential pixel erosions from the reference component(s) (and neighboring domains) can be made to define a surface or polygon reference component origin.

Similarly, a reference component origin consisting of a line can be defined in various ways. In one example, the reference component(s) can be circumscribed within a box or closed curve, and a line along the middle of the box can be defined as the reference component origin (3I-J). Alternatively, the longest diagonal across a single compact (3K) or disperse (3L) reference component can be defined as the reference component origin.

As used herein, "cellular domains" comprise segments within the cell that are defined relative to the reference component origin, and that have a well defined spatial relationship to each other. The domains can be any subset of contiguous pixels in an image that can be distinguished from other pixel subsets, with a single pixel as the smallest possible domain. As used herein, "contiguous" means that all pixels in the subset can be connected together without leaving the boundaries of the subset.

Figure 4:
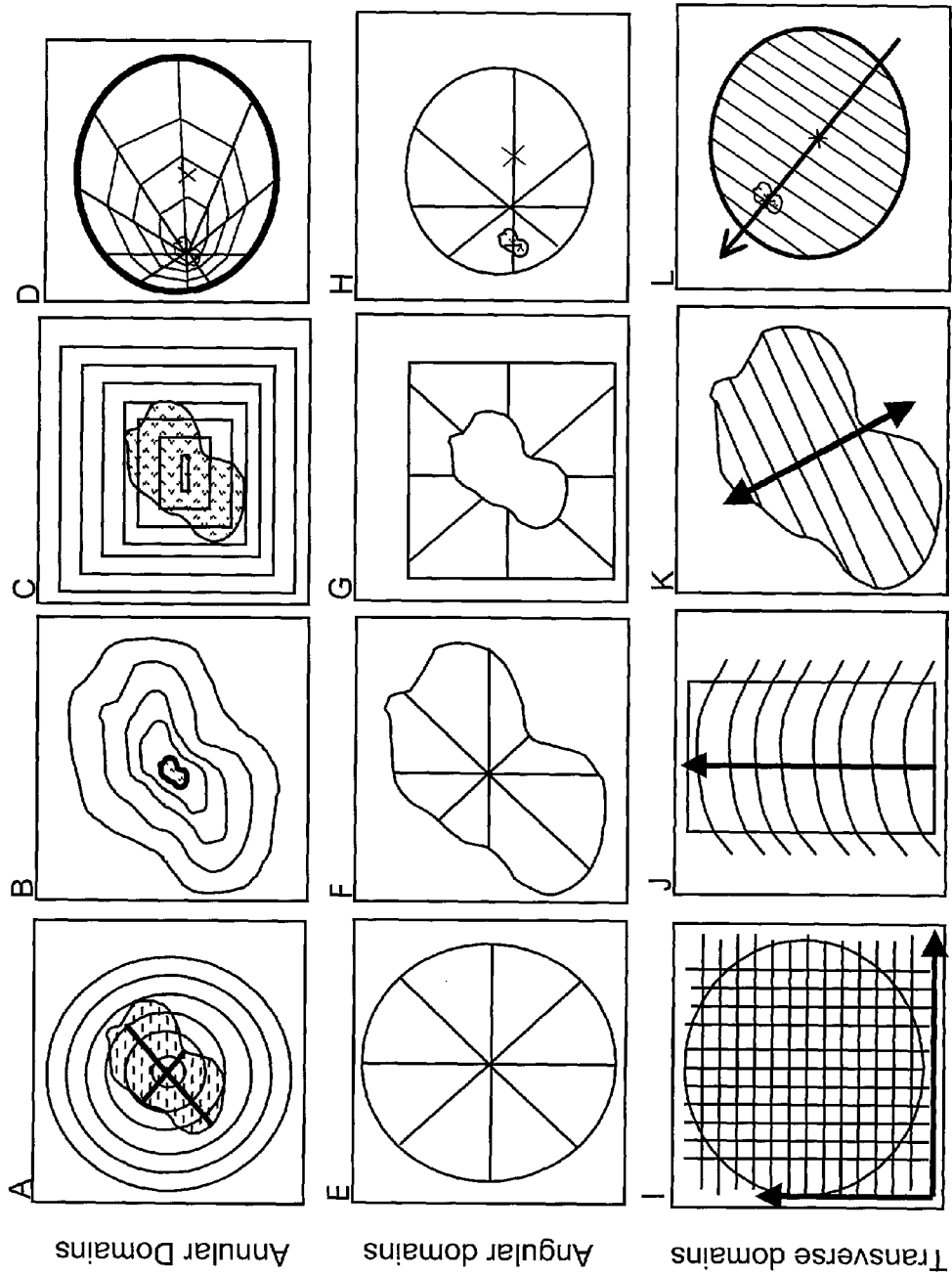
FIG. 4 illustrates different methods to segment a two-dimensional cell image into domains.

Referring to FIG. 4, two-dimensional cellular domains can be determined, for example, by segmenting cells into annular domains (4A-D), angular domains (4E-H) or transverse domains (4I-L). "Annular domains" are nested one within the other. Their shapes include, but are not limited to, circular (4A), irregular (4B), or polygonal (4C-D). The position of annular domains is defined according to the domain's radial distance from the reference component origin. Concentric annular domains can be defined, for example, by drawing self similar circles, polygons or other closed shapes around single reference component origins consisting of a point (4A), a surface (4B) or a polygon (4C). Concentric annular domains do not need to be concentric around a single reference component origin. For example, annular domains can be defined by drawing lines equidistant between a reference component origin consisting of a polygon and a reference component origin consisting of a point (4D).

"Angular domains" are domains whose position is rotated with respect to each other. Their shapes can include, but are not limited to, regular wedges (4E), irregular wedges (4F and 4H), or polygons (4G). The position of angular domains can be defined by the angular rotation of a line around a single point. This point can be the reference component origin (4E-G) or it can be a different point, such as a point equidistant between two different reference component origins (4H).

"Transverse domains" are those domains that are stacked one upon the other in a linear fashion. Their shapes can include, but are not limited to, polygonal (4I), curved (4J), or straight (4K-L). The direction in which transverse domains are stacked is defined by a line or axis. This axis can be equivalent to a reference component origin line. Individual cells can be divided into domains stacked along one (4J-L) or more than one axis (4I). When the axes are straight lines perpendicular to each other (4I), and the domains are of equal size, the position of each domain can be defined as in a Cartesian coordinate system. Domains that are stacked in a particular direction are said to be polarized (4I, J, L). This directionality can be intrinsic to the shape of the domain (4J), or it can be extrinsic to the domain, as when the edges of the image (I) or two reference component origins (4L) are used to define the axis.

In a further alternative, the cellular domains consist of a combination of annular, angular, and/or transverse domains. In a non-limiting example, one or more annular domains defined around the reference component origin can be divided into a series of angular or transverse domains.

Figure 5:
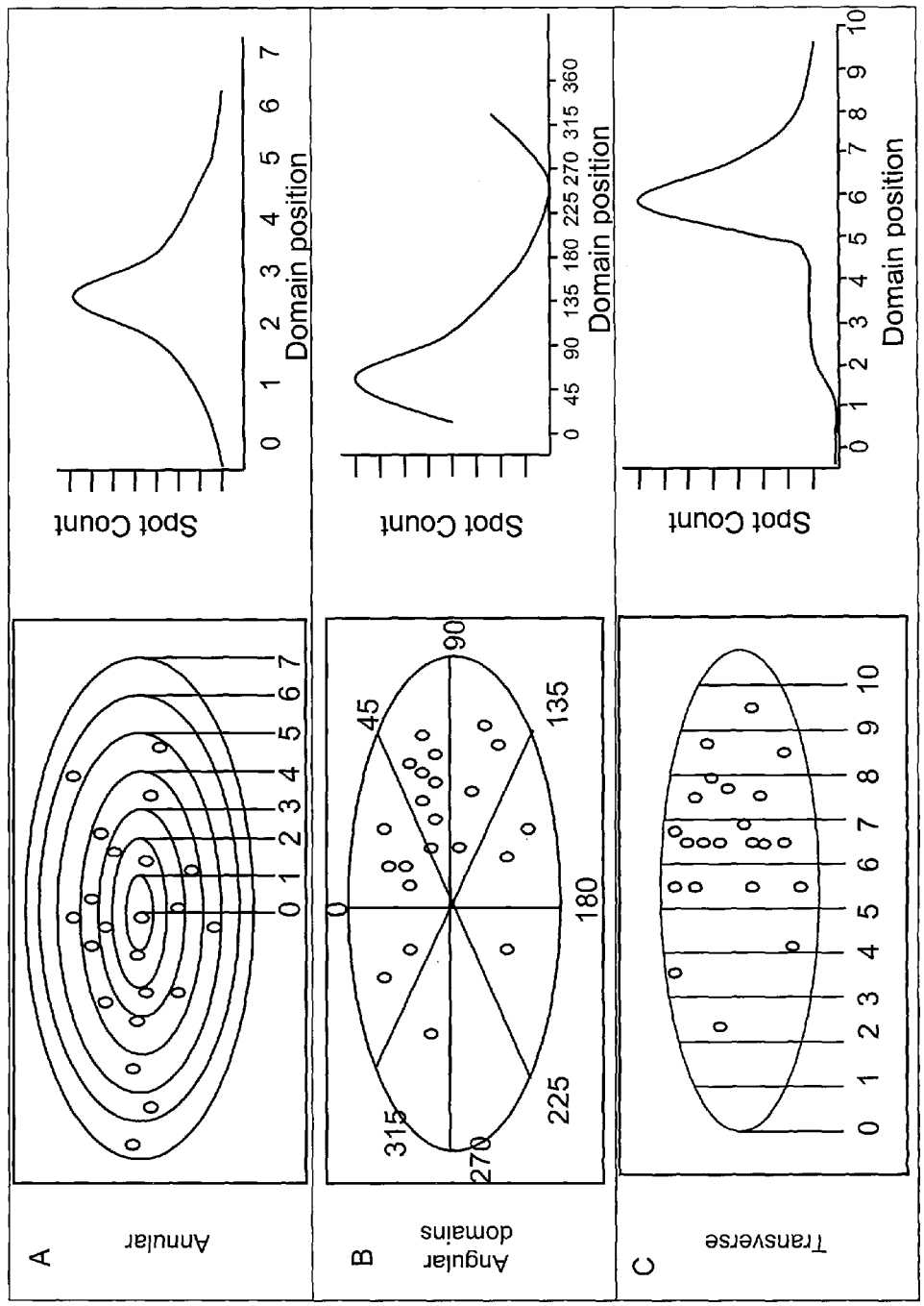
FIG. 5 illustrates methods for graphing the organization of the cellular component of interest as a function of domain position.

As used herein, a "position" of the cellular component is a distance or an angle of the cellular component relative to the reference component origin. Referring to FIG. 5, to define domain position, one of the domains is given a value of zero and sequential neighboring domains are numbered in relation to each other. Plotting the amount or distribution of the cell component of interest as a function of domain position allows one to analyze the organization of the cellular component of interest within each cell. This way, intracellular gradients of the cellular component associated with each domain can be analyzed in absolute terms as a function of domain position, or in relative terms as a rate of change with respect to domain position, time, or experimental conditions.

In the case of cells that are segmented into annular domains, domain position can be defined, for example, linearly by a distance in the radial direction, relative to the reference origin (5A). In the case of cells that are segmented into angular domains (5B), domain position can be defined, for example, by an angle or distance in the circumferential direction. In the case of cells that are segmented into transverse domains (5C), domain position can be defined, for example, by the sequential order of the domains along the axis.

Referring back to FIG. 1, each measurement of cellular component organization involves at least two cell images: a reference component image (1A), which allows segmentation of cells into one or more cellular domains over which measurements are made; and a cellular component image (1B). Using the reference component image, a reference component origin is determined for individual cells in a field (1D). This origin is the starting point for segmenting the individual cell (1C) into one or more adjacent cellular domains, arranged in such a way that they have defined position relative to the reference component origin (1E). Overlaying these domains onto the cell component image (1F) allows measurement of the amount or distribution of the cellular component of interest, in relation to that domain's position.

The organization of the cellular component within such domains can be calculated as a function of each domain, permitting determination of overall trends in organization of the cellular component. For example, domains just outside of the reference component origin may be localized within a narrow range of angular positions relative to the reference component origin, and may have distributions that show large clumps and low background. Domains that are farther out from the reference component origin may have less intensity, smaller spots, and less angular non-uniformity. Plots of clustering vs. domain radii would thus serve as a quantitative measure of the intactness of the cellular component.

Various methods can be used to determine the amount or distribution of the cellular component within the domains. For example, one can threshold the cellular component image and determine the number of above-threshold objects within the domains, the area covered by those thresholded objects, the shape of those objects, as well as the distribution of those objects, as a function of position within or between the domains. This example would be the preferred form of analysis when the cellular component(s) being measured is a discrete subcellular component that may be resolved individually, and whose distribution may change in the angular direction relative to the reference component origin.

A distribution of the signals from the cellular component reporter molecule(s) can be measured by several other strategies. One example is to plot a histogram of image pixel intensity vs. the number of pixels at each intensity within or between domains. Other examples include, but are not limited to the mean intensity, the variation (standard deviation), the skew (slant of the distribution to high or low values) and the kurtosis (the peak shape, concave or convex) of the signal distribution. Other mathematical measures of distribution could be applied including texture analysis to measure the grain size of the optically detectable signals from the cellular component reporter molecule(s) (most appropriate for determining the scale of evenly clustered objects), Fourier transform analysis to determine the spatial frequency of the signals from the cellular component reporter molecule(s) (most appropriate for discriminating objects that are distributed with high to low periodicity in the image), and Hough transform for determining the connectedness of optically detectable signals from the cellular component reporter molecule(s) into linear or arc-like arrays (most appropriate when determining the organization of objects into line-like patterns such as a string of pearls or clusters of parallel fibers).

A more general approach describes the spatial distribution of the cellular component within concentric annular domains, using a mathematical function to define the changes in pixel intensity as a function of the domain's circumference. This embodiment would be the preferred form of analysis when the cellular component(s) being measured has a polarized or periodic distribution. Such a mathematical function includes, but is not limited to, a Fourier transform function describing the distribution of pixel intensities within and/or between the domains For example, in the case of domains of single or multiple pixel width, one could plot the pixel intensities in the form of a polar coordinate graph, and characterize such a pixel distribution by its one-dimensional Fourier transform in the circumferential direction to describe the periodicity of the intensity distribution within and between the domains. One could also create domains of 1, 2, 3, 4, or more pixels in width that can be analyzed, where the pixel distributions within and/or between the domains are described in terms of the number of maxima, minima, inflection points, pixel intensities above or below a certain threshold, or any other property of the pixel intensity distribution.

The measurements made in the methods of the present invention are preferably cell based. As used herein, the term "cell-based" means that the measurements are made on individual cells. Various field-based (i.e.: calculations determined for the field being viewed, such as statistical analyses of the cell-based measurements in a field), well-based (i.e.: calculations determined for cells in an individual well on a multi-well plate (such as a microplate) that is currently being analyzed, such as statistical analyses of the cell-based or field-based measurements in a well), or plate-based (i.e.: calculations determined for the plate that is currently being analyzed, such as statistical analyses of the cell-based, field-based, or well-based measurements in a plate) measures can also be determined using these methods.

The methods described herein permit the use of identical reporter molecules to identify different cellular components and reference components. For example, the nucleus can be used as the reference component by labeling it with an optically detectable reporter molecule such as Hoechst 33342 (Molecular Probes), which specifically detects nucleic acids. A nuclear binary mask could then be derived and used to define the center of the nucleus. Sequential ring dilations from the center of the nucleus could be used to define domains within the nucleus and used to study intranuclear nucleic acid distribution. In a further non-limiting example, rhodamine-phalloidin labeled actin can be used, first to determine the center of mass of the actin filament system (i.e.: as a reference component), defining domains around the center of mass of the actin filament system, and determining organization of actin filaments within and/or between the domains.

The methods of the invention can be used to determine the spatial organization of multiple cellular components of interest, by using an additional optically detectable reporter molecule(s) (second, third, etc.) that detects another cellular component(s) of interest.

Similarly, the spatial organization of the cellular component of interest can be determined relative to more than one reference component in the cell. For example, the cell nucleus and the cell plasma membrane could be used as separate reference components (see below). In another example, a first reference component (for example, a nucleus) can be used to define a first reference component origin and a plurality of cellular domains, and a second reference component (for example, cytoplasm) can be used to exclude any cellular component of interest that do not co-localize with the second reference component. The second reference component is preferably spatially subdivided into individual domains, each of which is associated with a domain of the first reference component due to overlap or spatial proximity, wherein the co-localization requirement is that the cellular component measured within the domains set up with respect to the first component of reference origin must co-localize specifically with those set up with respect to the second component of reference origin.

Figure 2:
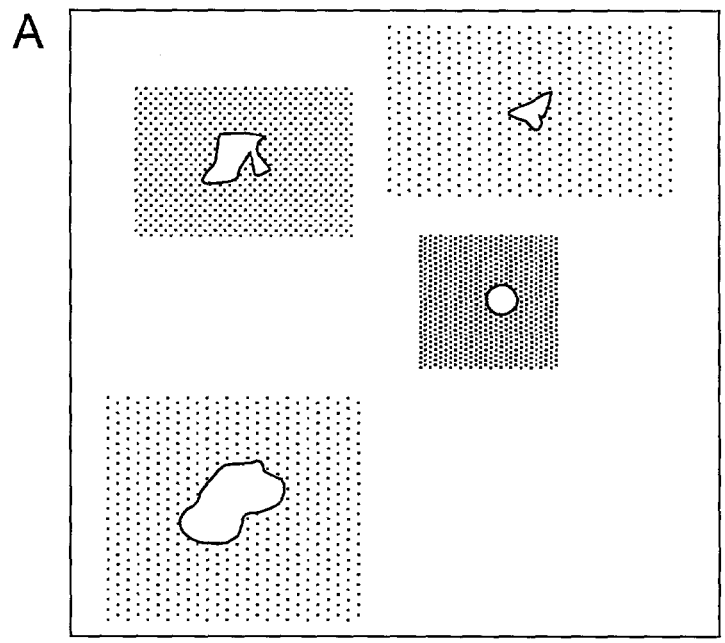
FIG. 2 shows different methods of identifying a cell boundary.
Figure 2:
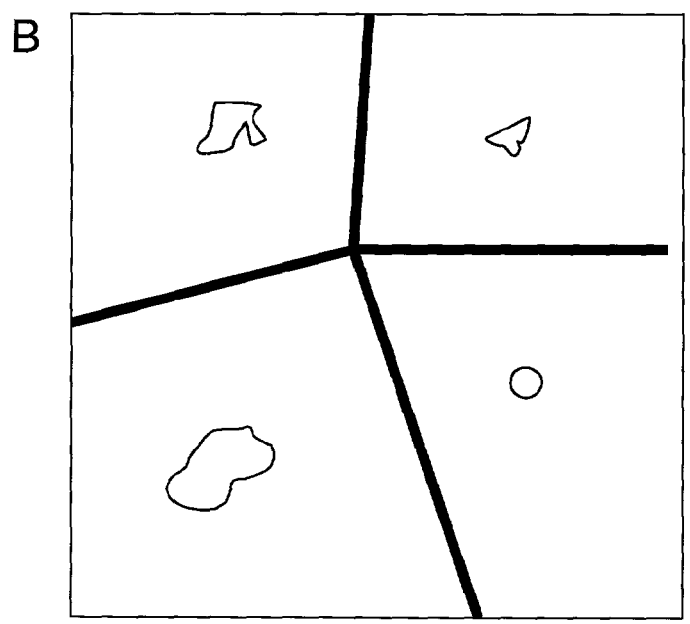
Figure 2:
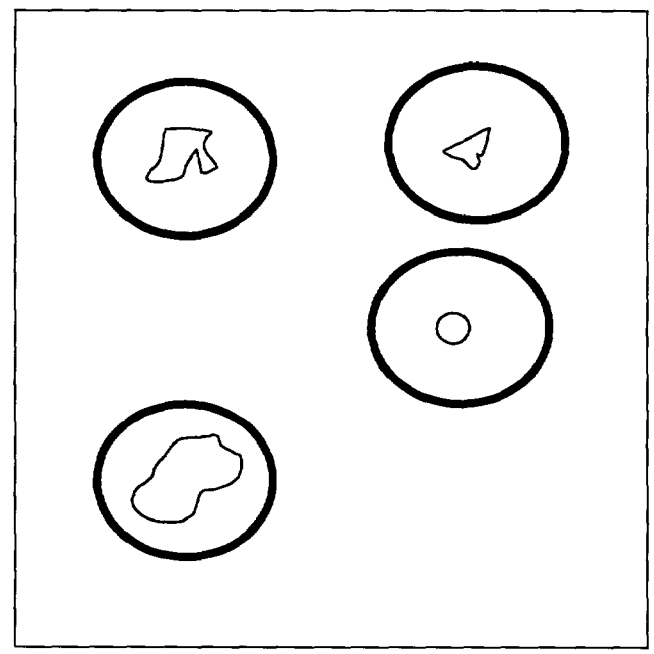
Figure 2:
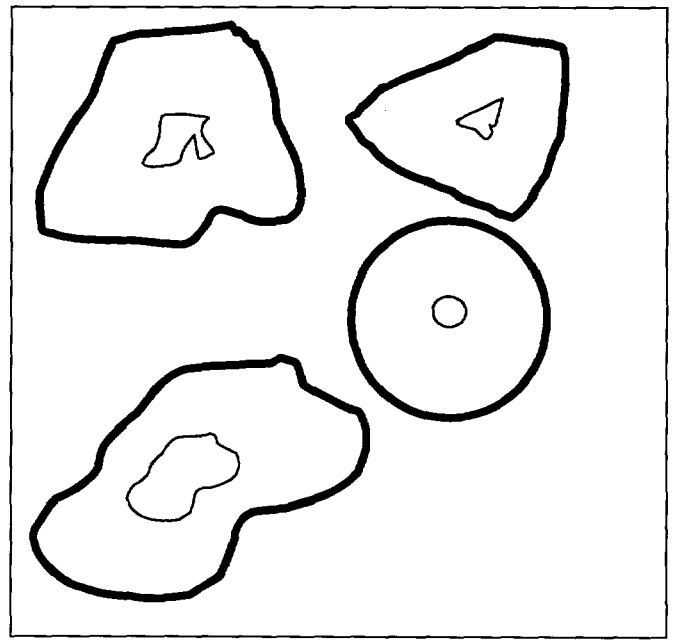

In a preferred embodiment, the method further comprises defining cell boundaries. Referring to FIG. 2, a non-limiting series of methods for defining cell boundaries is provided. In one example, the cell component of interest image can be used to define the edge of the cell, for example, by using a thresholding function or an edge detection function (2A). Alternatively, the reference component image can be used to algorithmically define the cell boundary (2B-D). For example, the cell boundaries can be defined by a line separating each individual cell reference component (2B). Alternatively, the cell boundary can be defined by a circle or polygon drawn at a certain distance from the cell reference component origin (2C). In a further alternative, the cell boundary can be defined relative to the perimeter of the cell reference component by dilating the perimeter a given distance (2D). The specific shape of the domains can also be determined by interpolation between boundary conditions.

For example, if the cell boundary was labeled with a membrane stain and the nucleus was labeled with a nuclear stain, a concentric set of rings could be formed that exactly fill the space between the nuclear border and the cell border. The cell boundary can also be considered a reference component origin, and thus its defining permits the analysis of cellular component organization as a function of domain position from multiple reference component origins. In a further example, where an image contains multiple cells, the nucleus can be used as the reference component, and cells could be artificially defined as the space up to a border that is equidistant between adjoining nuclei. The domains would then be defined as concentric rings whose shape is determined by interpolating between the nuclear border and the artificial cell border. The advantage of this method is that the domains can be defined according to the pattern of organization of a cell colony, and the organization of cellular components can be defined statistically as being proximal or distal to each reference component. For example, if the nucleus is used as the reference component, one could determine whether microtubule organizing centers are proximal to nuclei, and/or whether they are angularly distributed to one side of the nucleus. The method could further include determining organization of the microtubule organizing centers relative to some external marker, including but not limited to the location of a point source of a chemotactic chemical, or multiple secondary reference points such as co-cultures between two dissimilar cells that tend to interrelate in unique patterns (such as cells that form bipolar formations during synapse formation or natural killer lymphocytes and their target cells).

In a preferred embodiment of the method, the reference component is the nucleus, and the reference component origin is the nuclear perimeter. In this embodiment, a perinuclear region can be identified around the nuclear perimeter as a domain. As used herein, the term "perinuclear region" refers to a region of the cell outside but proximal to the nucleus. While any method for defining a perinuclear region can be used, in one embodiment, the perinuclear region is defined by thresholding the nucleus to create a nuclear mask and dilating it a certain number of pixels to define the outer boundary of the perinuclear region. Similarly, the inner boundary of the perinuclear region is preferably defined by dilating the nuclear mask by a number of pixels less than the outer boundary of the perinuclear region, and then subtracting out the original nuclear binary mask. Based on the dilation of the nucleus, the width of the perinuclear region can be varied. In addition, the distance of the perinuclear region from the nuclear perimeter can also be varied, by expanding the perinuclear region. Such expansion may be performed by eroding the inner border of the perinuclear region and dilating the outer border by a given number of pixels. Alternatively, such expansion may be performed by over-dilating the original nuclear binary mask, and then subtracting out an expanded nuclear binary mask. In a most preferred embodiment, the cell is segmented by defining further domains around the perinuclear region, and the organization of the cellular component of interest is measured within and/or between the one or more domains as a function of domain position.

In an alternative embodiment, a reference component origin other than the nuclear perimeter is used that does not comprise the nucleus in its entirety, and a nuclear binary mask is created by thresholding of such a nuclear marker, creating a binary mask of the nuclear marker, and dilating the nuclear marker binary mask to the approximate area of the nucleus. Alternatively, the nuclear marker binary mask or the nuclear binary mask can be eroded from the edge inward, to a minimally eroded area about a center of erosion. As with a nuclear binary mask, such a center of erosion can serve as a reference point from which a perinuclear ring is generated. Alternatively, the centroid of the nucleus can be calculated based on the nuclear binary mask, and such centroid can be used as a reference point from which to generate the cellular domains.

Figure 6:
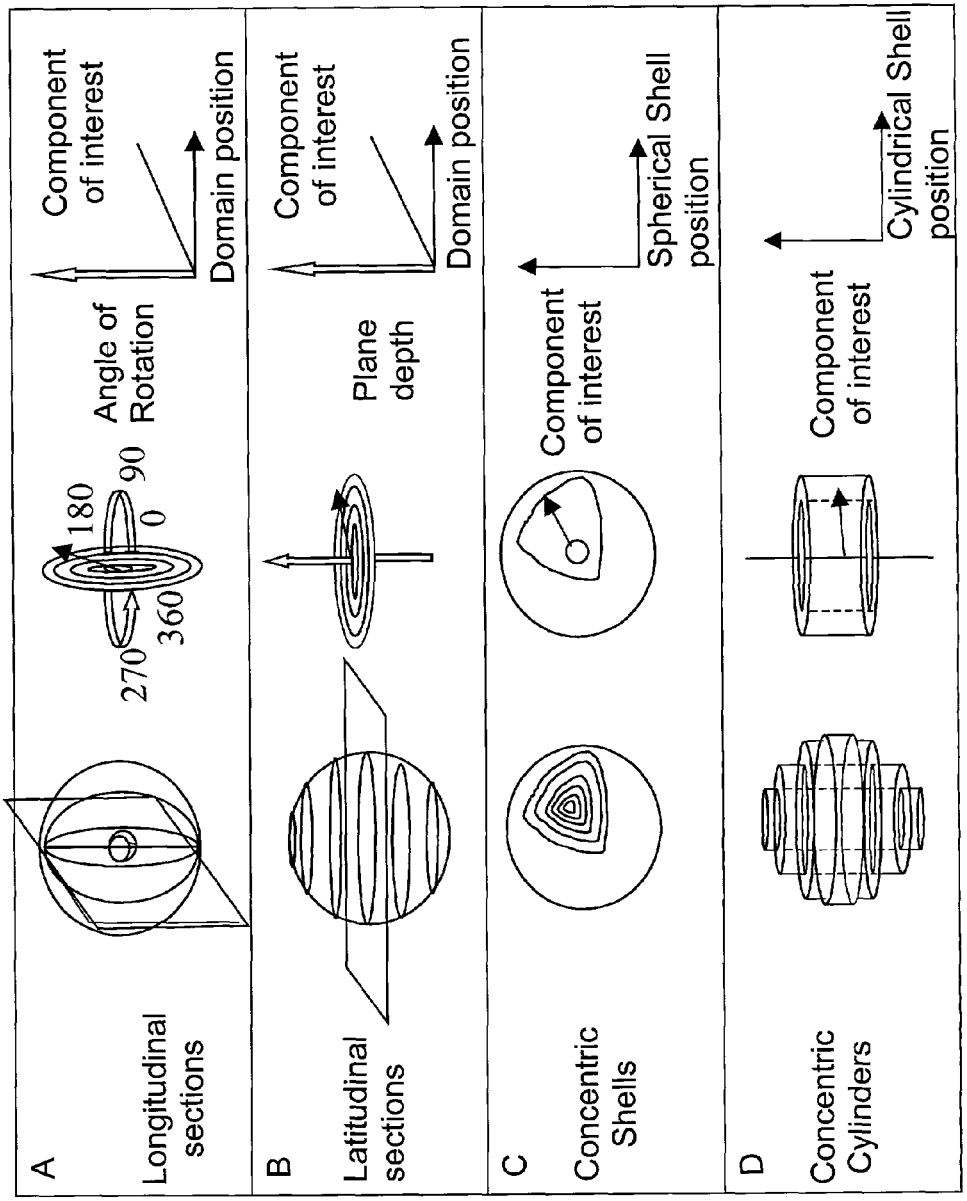
FIG. 6 illustrates different ways to segment a three-dimensional cell into spatial domains.

All of the embodiments disclosed herein can also be generalized to three-dimensional structures. Referring to FIG. 6, three dimensional cells can be segmented into two-dimensional spatial domains (6A,B) or three dimensional spatial domains (6C,D) in variety of different manners. For example, cells can be cross-sectioned longitudinally, and each cross section could itself be divided into annular domains (6A). In such a case, the spatial organization of a cell component of interest could be determined by plotting the cell component of interest in the z dimension, relative to the annular domain position in the x dimension and the longitudinal angle of rotation in the y dimension. Alternatively, cells could be cross-sectioned latitudinally, and each cross section could itself be divided into annular domains (6B). In such a case, the spatial organization of a cell component of interest can be determined by plotting the cell component of interest in the z dimension, relative to the annular domain position in the x dimension and the latitudinal distance in the y dimension. In a further alternative, cells can also be segmented into nested shells in three dimensions (6C). In such a case, the spatial organization of a cell component of interest can be determined by plotting the amount or distribution of the cell component of interest relative to the angular position of the each shell. Similarly, cells can be segmented into a set of nested cylinders (6D). In such a case, the spatial organization of a cell component of interest could be analyzed by plotting the amount or distribution of the cell component of interest relative to the angular position of each cylinder.

In the case of longitudinal cross-sections, the cross sections can be assembled from images acquired with the aid of a confocal microscope, or generated by image deconvolution software using a standard epifluorescence microscope equipped with an objective with a narrow depth of focus to collect multiple focal planes parallel to the surface of the bioassay plate.

In the case where the reference component is the nucleus, a perinuclear shell can be generated by thresholding the image of the nuclei at each longitudinal plane, and constructing a nuclear binary mask based on the thresholded image. From the nuclear binary mask of each longitudinal plane, a perinuclear ring mask is constructed, using any of the methods described above. This perinuclear ring mask can be expanded outwards of the nucleus, as described above. By stacking the sequence of perinuclear ring masks at each longitudinal plane a three-dimensional reconstruction of a perinuclear shell is obtained. Sequential expansions of this perinuclear shell provide a series of concentric perinuclear shell domains that can be use to analyze the organization of the cellular component relative to shell domain position.

Figure 7:
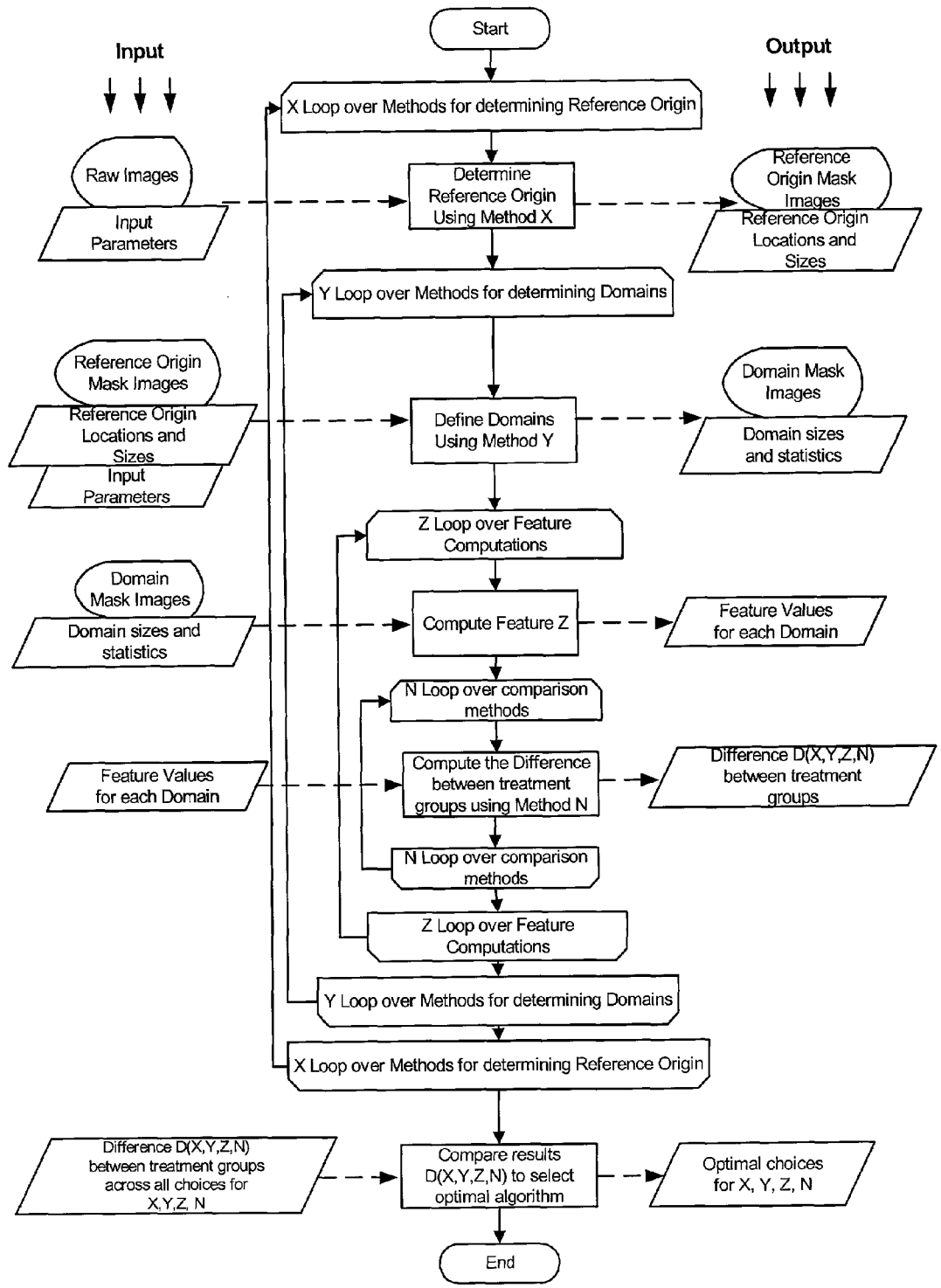
FIG. 7 is a flow chart that outlines the process of combining algorithmic modules (X,Y,Z, and N) to identify the best combination of algorithms for use in analyzing spatial organization.

In a further embodiment, different algorithmic modules (X,Y,Z, and N) can be combined to identify the best combination of algorithms for use in analyzing spatial organization. This embodiment is exemplified in FIG. 7, wherein X stands for a variety of possible algorithms to identify the reference component origin (including but not limited to those disclosed above and below), Y stands for a variety of possible algorithms to segment cells into domains (including but not limited to those disclosed above and below), Z stands for a variety of possible algorithms to determine the cell component of interest amount or distribution within the domains (including but not limited to those disclosed above and below), and N stands for a variety of possible algorithms that can be used to compare the organization of the cell component of interest in a control vs. experimental condition (including but not limited to those disclosed above and below). By measuring the difference in spatial organization $D(x,y,z,n)$ between control vs. experimental conditions with all possible combinations of algorithms, one can identify the best combination of algorithms that gives the greatest difference between control and experimental conditions. This combination of algorithms can then be used to scan cells in wells on a multi-well plate. In addition to the image analysis algorithm, scanning a plate includes the mechanics of acquiring the images (moving to the well to be analyzed, moving to the field to be analyzed, focusing on the cells, acquiring the images on the desired fluorescence channels, magnification, illumination, and storing the images). In order to appropriately compare control and experimental conditions, it is preferable that the images are acquired with the same scanning algorithm such that differences between control and experimental conditions are not due to differences in the magnification, resolution, magnification, filter wavelengths, camera integration times, illumination intensity, optics, etc and other variables associated with the acquisition of the images.

In a non-limiting example, using the nucleus as the cell reference component and microtubules as the cell component of interest, one can combine three algorithms to identify a cell reference component origin point (the center of a nuclear bounding box, $x=1$; the nucleus' center of mass, $x=2$; the intersection of the long and short axis of the nucleus, $x=3$) with three algorithms to segment cells into domains (angular, $y=1$; annular, $y=2$; transverse based on a random line through the component of reference origin point, $y=3$) to yield a total of 9 possible segmentation schemes ($x=1$ with $y1$; $x=2$ with $y=2$; $x=1$ with $y=3$; $x=2$ with $y=1$; $x=2$ with $y=2$; $x=2$ with $y=3$; $x=3$ with $y=1$; $x=3$ with $y=2$; $x=3$ with $y=3$). In turn, these nine possible segmentation schemes can be combined with 3 possible ways to measure microtubule-associated fluorescence within each domain (mean pixel intensity, $z=1$; standard deviation of pixel intensity $z=2$; min-max range of pixel intensity, $z=3$) to yield 27 different ways of measuring microtubule distribution within each cell. In turn, one could determine the spatial organization of microtubule distribution by (1) calculating the slope of microtubule distribution as a function of domain position, given a linear fit $n=1$; or (2) by calculating the $R^2$ value of the microtubule distribution as a function of domain position, given the best linear fit, $n=2$; or (3) by calculating the degree of correlation of microtubule distribution for a given domain, with that of a neighboring domain, $n=3$. These three different ways of determining spatial organization could be combined with the 27 different ways of measuring microtubule distribution to yield $27 \times 3 = 81$ different ways of measuring microtubule spatial organization within each cell. Indeed, one advantage of being able to search through all the combination of possible algorithmic modules necessary for establishing the greatest difference between control and experimental condition is that a very large number of different ways of determining spatial organization of microtubules can be evaluated. Since the number of different algorithmic combinations increases exponentially with the number of algorithms, the chance of identifying an image analysis method suitable for screening is greater than if the algorithmic modules are not combined.

One of skill in the art will recognize that this method of combining algorithmic modules to identify the best combination of algorithms for use is defining the organization of a cellular component of interest in individual cells can be used for any cellular component of interest, reference component, methods for defining the plurality of cellular domains, and measurement options, as described above, and is not limited by the details of the example provided.

All of the above embodiments of the invention preferably further comprise contacting the cells with one or more test stimuli prior to the imaging; wherein a change in the organization of the cellular component reporter molecule(s) in the cells contacted with the test stimuli relative to cells not contacted with the test stimuli, other cells in the test sample, or relative to the same cells at different time points, demonstrates an effect of the test stimuli on the organization of the cellular component of interest. The test stimulus can be of any nature, including chemical compounds, drug candidates, environmental samples, or any other stimulus of interest. The test stimulus can be a single stimulus, or may comprise a plurality of stimuli, including but not limited to combinatorial chemical libraries and natural compound libraries.

The presently claimed methods are broadly applicable to the detection of changes in the organization of any spatially segregated cellular component, including but not limited to entire organelles, nucleic acids, lipids, carbohydrate, and proteins. For example, in drug discovery applications, the organization of a cell surface receptor can be measured by tracking its internalization following stimulation of cells with a specific receptor ligand. Similarly, mitochondrial or lysosomal organization can be monitored by assessing changes in their morphology following treatment of cells with toxic compounds.

In another aspect of the present invention, a machine readable storage medium comprising a program containing a set of instructions for causing a cell screening system to execute procedures for defining the organization of a cellular component of interest in individual cells according to the methods described above is provided. The computer readable medium includes but is not limited to magnetic disks, optical disks, organic memory, and any other volatile (e.g., Random Access Memory ("RAM")) or non-volatile (e.g., Read-Only Memory ("ROM")) mass storage system readable by a central processing unit ("CPU"). The computer readable medium includes cooperating or interconnected computer readable medium, which can exist exclusively on the processing system of the cell screening system, or be distributed among multiple interconnected processing systems that may be local or remote to the cell screening system processing system.

In a preferred embodiment, the cell screening system comprises a fluorescence optical system with a stage adapted for holding cells and a means for moving the stage, a digital camera, a light source, and a computer means for receiving and processing the digital data from the digital camera.

In a series of non-limiting examples, the methods of the present invention were applied to the analysis of cells labeled with an anti-tubulin antibody, and treated with a variety of drugs that alter the spatial organization of tubulin. Nuclear and microtubule images were obtained, and a binary image of the nuclear image was created, such that the position of each nucleus in the field defined the position of each cell.

EXAMPLES

Cell culture/drug treatments: Cells were plated on 96-well plates in the appropriate cell culture media plus 10% FBS. Paclitaxel, vinblastine, nocodazole and colchicine were prepared as 1 mM stocks in DMSO and diluted to the desired concentration in cell culture media. Different plating densities and treatment times were explored to maximize the observable effects of the drugs.

Immunofluorescence: This included three steps: (1) Extraction of soluble (monomeric) tubulin by permeabilizing the cells with 0.5% Triton X-100 in a microtubule stabilizing buffer, in order to remove unpolymerized tubulin. (2) Fixation of intracellular protein with 4% formaldehyde. (3) Microtubule, DNA, and (optional) total cellular protein fluorescence labeling. Microtubule staining was carried out by a standard immunofluorescence procedures using a primary mouse monoclonal antibody (anti-tubulin IgG), and affinity purified polyclonal secondary antibody (ALEXA FLUOR® 488-conjugated anti-mouse IgG (Molecular Probes, Inc. Eugene, OR)). After the cells were stained, DNA was labeled with 10 microgram/ml Hoechst 33342.

Image acquisition: Images were acquired with the ARRAYSCAN® II HCS system (Cellomics, Inc. Pittsburgh, Pa.), using a 10×objective. For cells triple-stained with tetramethylrhodamine iodoacetate (TMRIA) (Molecular Probes), Hoechst 33342, and ALEXA FLUOR® 488 (tubulin), or cells double stained with Hoechst 33342 and ALEXA FLUOR® 488, an XF57 filter block was used.

Image Analysis: Quantitative determination of microtubule polymer levels was performed using the methods described above. For analysis, a binary nuclear mask was made by thresholding the Hoechst image. The nuclear image was dilated to produce a perinuclear ring mask, where cytoplasmic tubulin polymer was measured. The ring mask allowed measurement of average intensity levels associated with the microtubule image. These measurements can distinguish nocodazole (a microtubule depolymerizer), paclitaxel (a microtubule stabilizer) and control-treated cell populations. Scan times under 30 minutes and Z windows of >0.2 were achieved. Other methods of image analysis that were used are described below.

Quantitative Determination of Microtubule Polymer Content

Quantitation of microtubule-associated intensity was carried out by summing the pixel intensities in the microtubule (MT) channel in the area covered by the perinuclear ring mask. This integrated pixel intensity was then divided by the actual area of the perinuclear ring mask to arrive at the mean or "average" pixel intensity in the region covered by the perinuclear ring. From these measurements a MT polymerization index was calculated by normalizing the amount of MT fluorescence in a treated, "experimental" cell population, versus the amount of MT-associated fluorescence in an untreated, control cell population. This polymerization index represents a fraction or percentage of MT polymerization or depolymerization, relative to the untreated controls. Other methods of quantitation that were used are described below.

In all of the following experiments, the results were consistent with the biological effect of the microtubule targeting drug(s) used.

3T3 cells on 96-well microplates were treated, images were collected, and statistical analysis was performed on the image data obtained from the plates. Two-hour treatment with nocodazole (5 micromolar) yielded a significant decrease in cell-associated microtubule intensity, consistent with its known, microtubule-depolymerizing mechanism of action. Two-hour treatment with paclitaxel (1 micromolar) yielded a significant increase in cell-associated microtubule intensity, consistent with its microtubule-stabilizing mechanism of action. Analysis of well-to-well differences indicated that edge effects can be an experimental variable influencing the outcome of the experiment.

In addition, preliminary time-course and 12 hour dose-response evaluations using paclitaxel, nocodazole, and vinblastine were performed. Paclitaxel yielded excellent dose response data. Nocodazole showed an unexpected effect: at nanomolar concentrations, the drug appeared to inhibit cell division without necessarily inducing the net depolymerization of microtubules. This led to an increase of microtubule polymer mass, because large (possibly tetraploid) cells accumulated, with duplicated microtubule arrays nucleated from two separate microtubule organizing centers. The frequency of these cells was high enough to skew analysis and present anomalous dose response curves. To eliminate this type of artifact, dose-response experiments can be carried out in shorter incubations (4 to 6 hours), instead of the 12 hour incubation used for this experiment. Vinblastine yielded dose-response data consistent with its mechanism of action: at micromolar doses, vinblastine induced the formation of tubulin paracrystals by binding the soluble tubulin subunits in a stochiometric fashion. This led to an apparent increase in microtubule polymer mass. At nanomolar doses, vinblastine depolymerized microtubules and inhibited microtubule polymerization, presumably by capping the free-ends of microtubules. Colchicine, a microtubule depolymerizer, yielded good dose-response curves, consistent with its microtubule-depolymerizing mechanism of action.

Quantitative Determination of Microtubule Organization Using a Single Perinuclear Ring Mask and Field Based Threshold Measurements Various types of analyses to assess the distribution of tubulin-associated fluorescence were performed. The first type of analysis involved thresholding and binarizing the cytoplasmic (MT) channel. From this thresholded binary image, objects of a certain size and shape were selected ("spots"). Such objects can be counted ("spot count"), or the area of the objects added ("spot area"). Using a perinuclear ring mask, those objects within a certain distance of each nuclear perimeter were considered for analysis, while those falling outside the distance were eliminated from analysis. This way, the total number of spots and the total area of spots around each nuclei were determined. In the case of untreated control cells, the number and area of spots around each nucleus corresponded to the presence of a single or duplicated centrosome or microtubule organizing center (MTOC), a spot in the cell around which all MTs converge in the form of a radial array. Treatment of cells with MT depolymerizing agents led to the disappearance of a visible centrosome or MTOC. Treatment of cells with a MT stabilizing, bundling, or aggregation agent led to the formation of multiple MT foci that may represent MT bundles, tubulin aggregates, or the formation of tubulin paracrystals. In these cells, microtubule foci can be detected and counted as a "spot". Thus, the number and area of "spots" in these images are a representation of the number and size of microtubule foci in the cells. In min-max plates, vinblastine led to a significant decrease in well average spot area, while partly increasing well normalized spot counts. In contrast, paclitaxel increased well average spot area, and partly increased well-normalized spot counts.

A different type of analysis involved generating a perinuclear ring mask, and determining the number of peaks and valleys in the cytoplasmic (microtubule) image, to categorize the spatial distribution of fluorescent pixel intensities associated with the nuclear periphery in control, nocodazole, paclitaxel, and vinblastine treated cells. These distributions can be classified into three types: mono-modal, non-modal, and multi-modal. Monomodal distributions consist of a single major peak of fluorescence intensity (coincident with the microtubule-organizing center, as present in control cells). Non-modal distributions lack a peak of fluorescence intensity (coincident with depolymerized microtubules in the presence of nocodazole). Multimodal cells consist of multiple peaks of fluorescence intensity (coincident with bundled microtubules in the presence of paclitaxel or with tubulin paracrystals in the presence of vinblastine).

Mathematically, the spatial distribution of pixel intensities were graphed against the circumference of the perinuclear ring mask, and the number of peaks (and associated number of pixels) determined by counting the number of objects above a specified threshold intensity. This type of spatial data can also be mathematically treated with Fourier transform analysis to yield a perfect numerical description of the spatial distributions of pixels associated with the perinuclear ring.

Finally, histogram distribution of microtubule-associated pixel intensities in individual 3T3 cells was used to distinguish control cells from cells treated with nocodazole, paclitaxel, and vinblastine. Although we determined that the optical density (OD) variance of the distribution could distinguish nocodazole vs. control cell populations and paclitaxel vs. control cell populations, the OD variance could not distinguish vinblastine vs. control cell populations. This result suggests that a useful measure of microtubule organization should make use of the spatial distribution of pixel intensities, as well as their statistical distribution.

Quantitative Determination of Microtubule Organization Using Concentric Perinuclear Ring Masks Using concentric expansions of the perinuclear ring mask, a plurality of cell domains were defined and it was determined that differences in microtubule organization could be distinguished by measuring changes in microtubule-associated fluorescence as a function of position within and/or between domains. Cells were treated with paclitaxel, nocodazole, colchicine, vinblastine, DMSO, or were left untreated, and the resulting pattern of microtubule-associated fluorescence was determined. Domains were defined by five sequential dilations of a perinuclear ring mask, and measurements were made of the mean microtubule-associated intensity, the standard deviation of the microtubule-associated intensity, the mean cytoplasm to nucleus fluorescence intensity ratio, and cell-normalized microtubule fluorescence intensity. For each drug treatment condition, experiments were performed in duplicate. Thus, it was possible to judge whether any observed difference in the pattern of microtubule-associated fluorescence could be ascribed to a drug-induced difference in microtubule organization, instead of reflecting the statistical well-to-well variability of the sampled cell population.

Duplicate wells subjected to the same treatment revealed similar patterns of microtubule-associated fluorescence, as compared to the wells subjected to different treatment. Moreover, there was a pattern of similarity in wells subjected to different treatment: untreated cells resembled DMSO-treated cells; nocodazole treated cells resembled colchicine treated cells; and, paclitaxel treated cells resembled vinblastine treated cells. This pattern is consistent with the known effects of the different treatments on microtubule organization. Indeed, both paclitaxel and vinblastine led to the formation of microtubule bundles or aggregates in the cytoplasm, while both nocodazole and colchicine led to microtubule disruption. In contrast, DMSO had very little effect on microtubule organization, so the pattern of microtubule organization in DMSO-treated cells resembled that of untreated cells.

Finally, the slope of the best linear fit of the microtubule associated fluorescence was calculated as a function of the angular dilation. This way, it was possible to compare the rate of change of these parameters as a function of domain position. As expected, the slope of cells subjected to the same treatment was more similar than the slope of cells subjected to different treatments. Moreover, the slope of cells treated with paclitaxel was most similar to the slope of cells treated with vinblastine; the slope of cells treated with nocodazole was most similar to the slope of cells treated with colchicine; and, the slope of cells treated with DMSO was most similar to the slope of untreated cells.

Cell-based Analysis of Different Microtubule-targeting Drugs Mechanism of Action The mechanism of action of microtubule-targeting drugs was assessed in a cell component of interest field, represented as an image of tubulin-stained cells. Fibroblasts, epithelial cells,) and monocytes were left untreated ) or were treated with a variety of microtubule-targeting drugs. Cells were fixed and then stained with anti-tubulin immunocytochemistry, in order to determine how the different drugs affect morphological organization of microtubules.

In fibroblasts, microtubules nucleated from a single foci (the MTOC, which appears as the brightest spot in association with each cell). Paclitaxel treatment led to the formation of microtubule bundles, and destroyed the focal organization of microtubules. Nocodazole depolymerized the microtubules, and led to a diffuse staining of tubulin throughout the cytoplasm. Vinblastine depolymerized the microtubules and led to the formation of tubulin paracrystals, visible as small dots within the cell cytoplasm.

In epithelial cells, microtubules appeared as an isotropic, tangled mass in the center of each cell. Paclitaxel treatment induced formation of microtubule bundles in association with the cell edge. Nocodazole treatment induced microtubule depolymerization and led to diffuse staining of tubulin throughout the cell cytoplasm. Vinblastine disrupted the microtubules and led to the formation of tubulin paracrystals.

In monocytes, microtubules were not clearly resolved and appeared to fill the entire cell. Paclitaxel treatment decreased microtubule staining in the nuclear region. Nocodazole treatment led to microtubule depolymerization and led to diffuse tubulin staining. Vinblastine led to an intermediate effect between nocodazole and paclitaxel, with some cells free of nuclear tubulin staining and some punctate fluorescence, while other cells showed diffuse tubulin staining.

Multi-domain Analysis of Tubulin Organization

Figure 8:
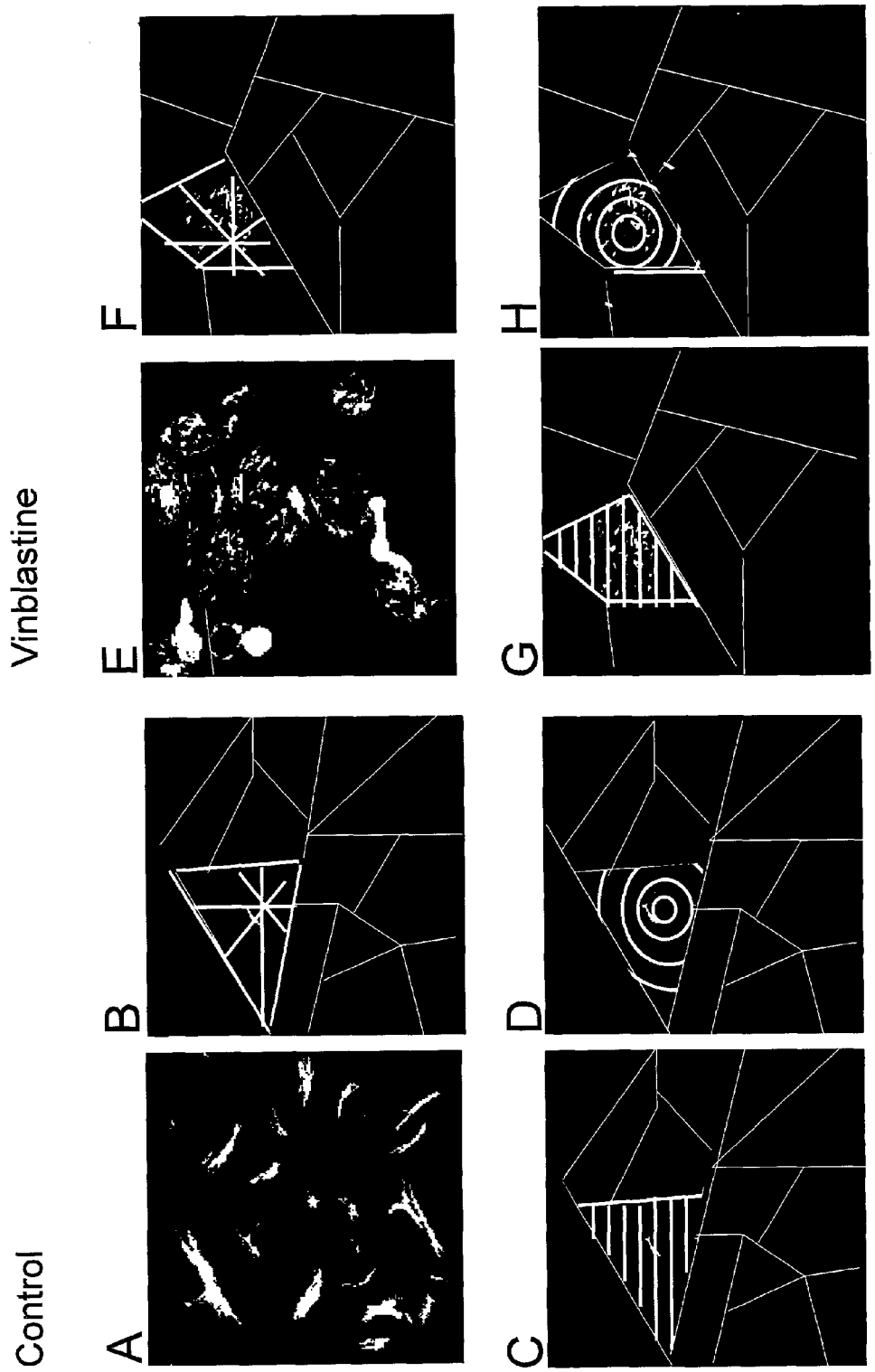
FIG. 8 demonstrates the use of various segmentation strategies to analyze microtubule spatial organization.

Referring to FIG. 8, experiments were conducted to analyze tubulin organization in untreated (8A-D) and drug-treated (8E-H) fields of cells using angular (8B,F), transverse (8C, G) or annular domains (8D,H). A cell component of interest field revealed the characteristic morphology of the microtubule cytoskeleton in control (8A) and vinblastine-treated cells (8E). For the purpose of analysis, cell boundaries were defined (8B-D, 8F-H) based on the reference component origin (which here is the nuclear perimeter). The component of interest field was thresholded to show the brightest pixels, and a single cell is shown for illustration purposes. Segmenting the control cell into angular (8B), transverse (8C) or annular (8D) domains revealed that the brightest thresholded pixels have a narrow distribution and are only present in one or two neighboring domains (for illustration purposes, cells have been segmented into only four annular domains or eight angular/transverse domains). In vinblastine treated cells, segmenting cells into angular (8F), transverse (8G) or annular (8H) domains revealed that the thresholded pixels had a broader distribution and were dispersed through a large number of domains, reflecting the disintegration of the microtubule cytoskeleton and the formation of small tubulin aggregates or paracrystals.

Figure 9:
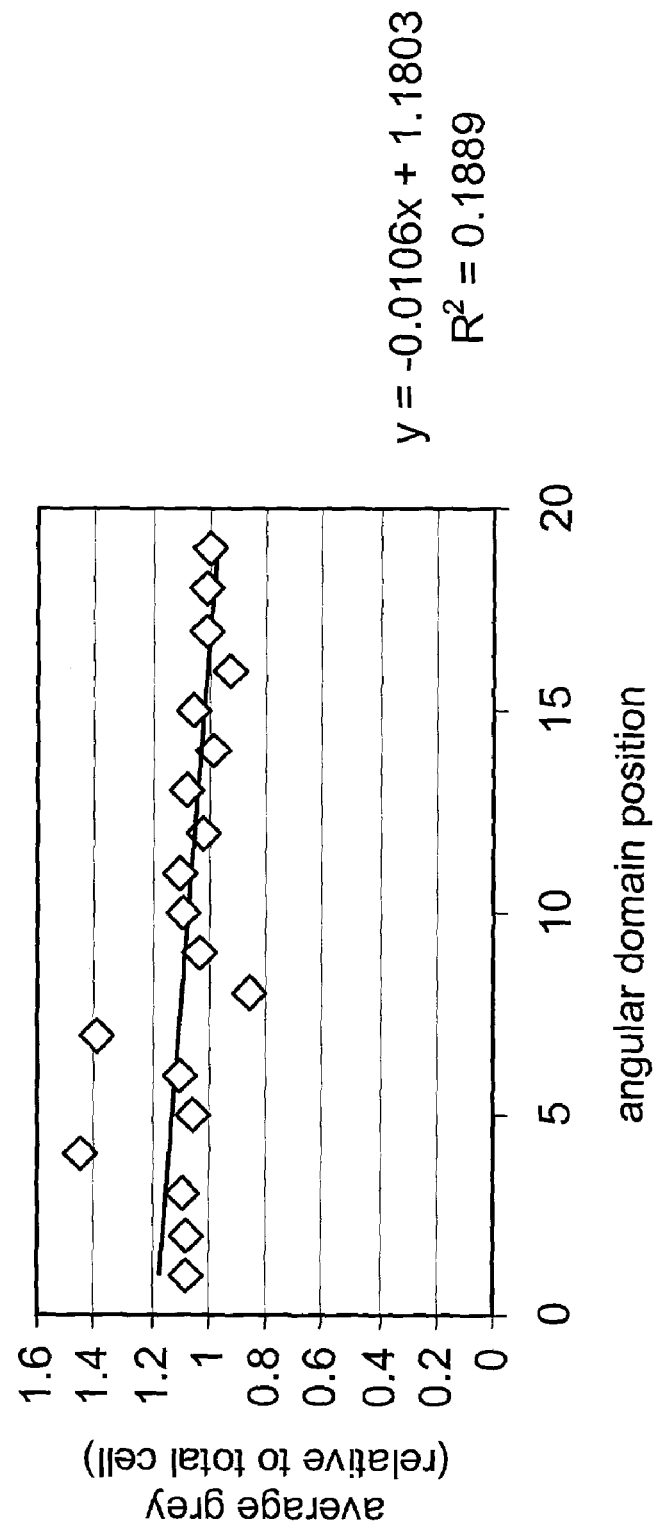
FIG. 9 A-F are graphs comparing the spatial organization of tubulin distribution within individual cells using annular domains.
Figure 9:
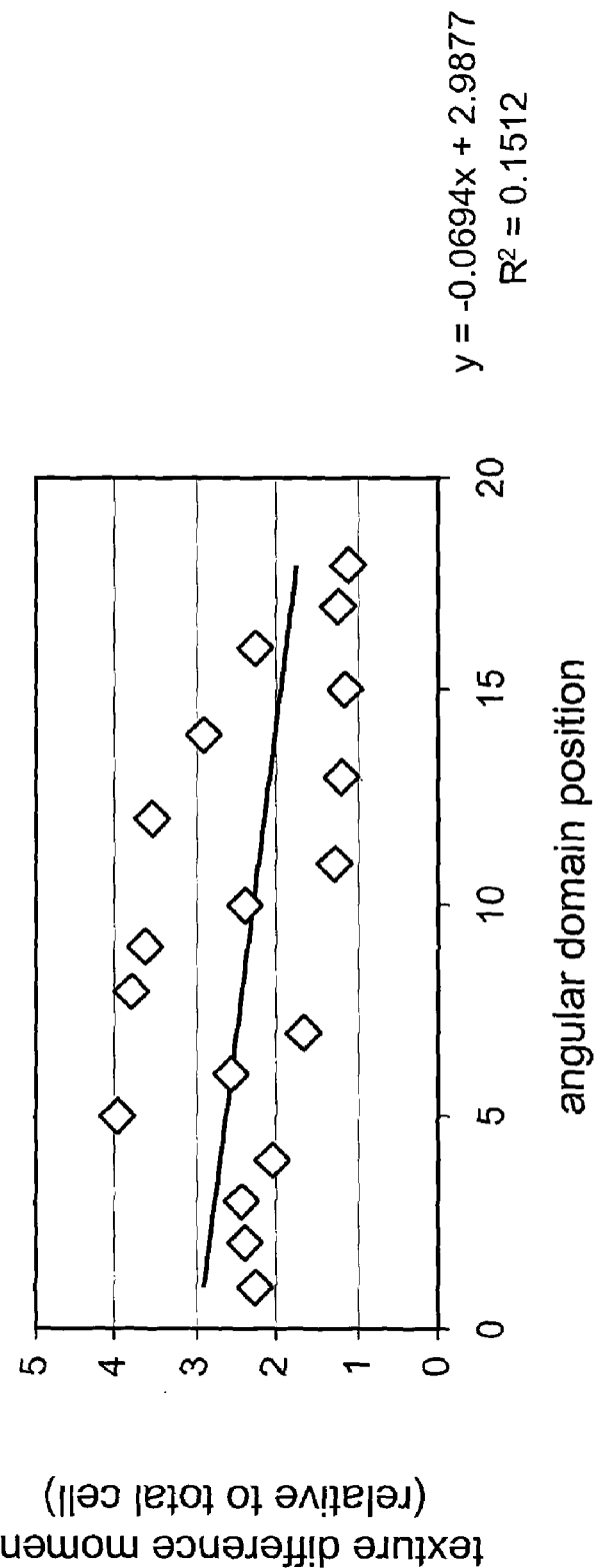
Figure 9:
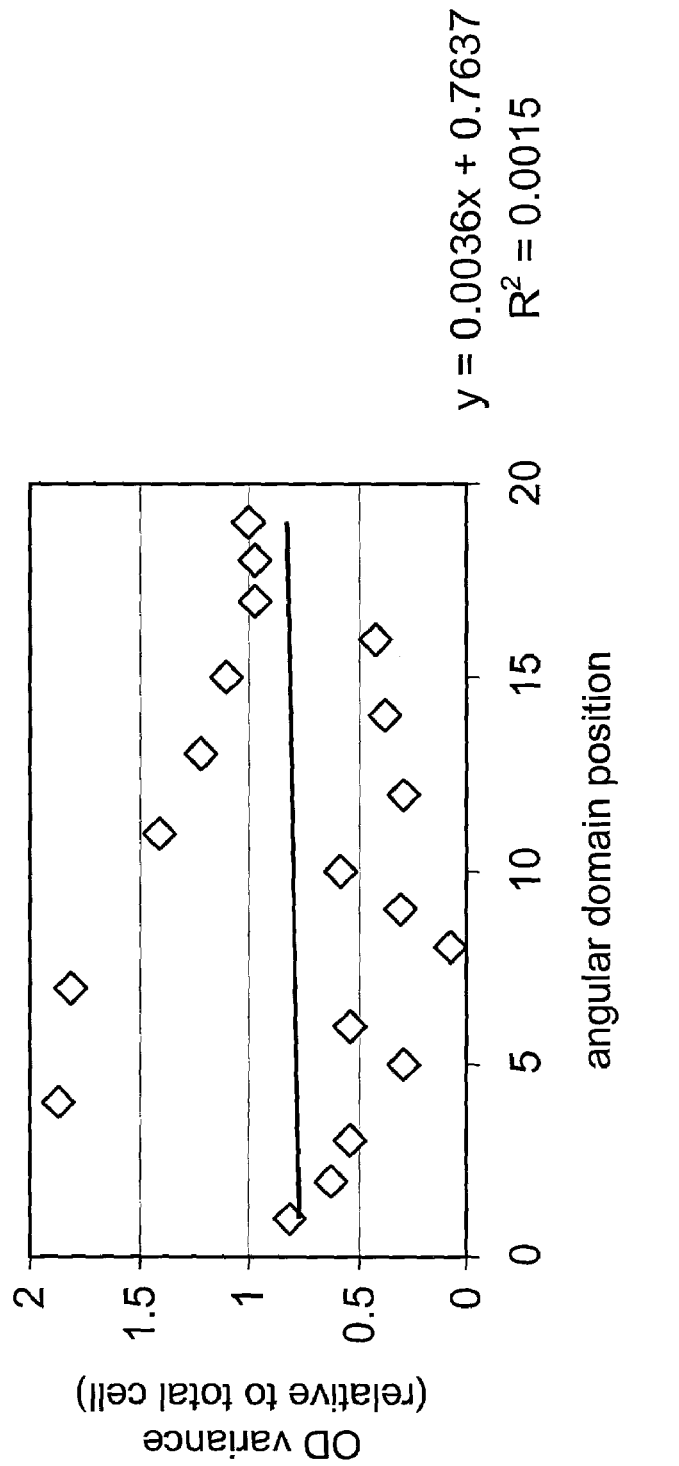
Figure 9:
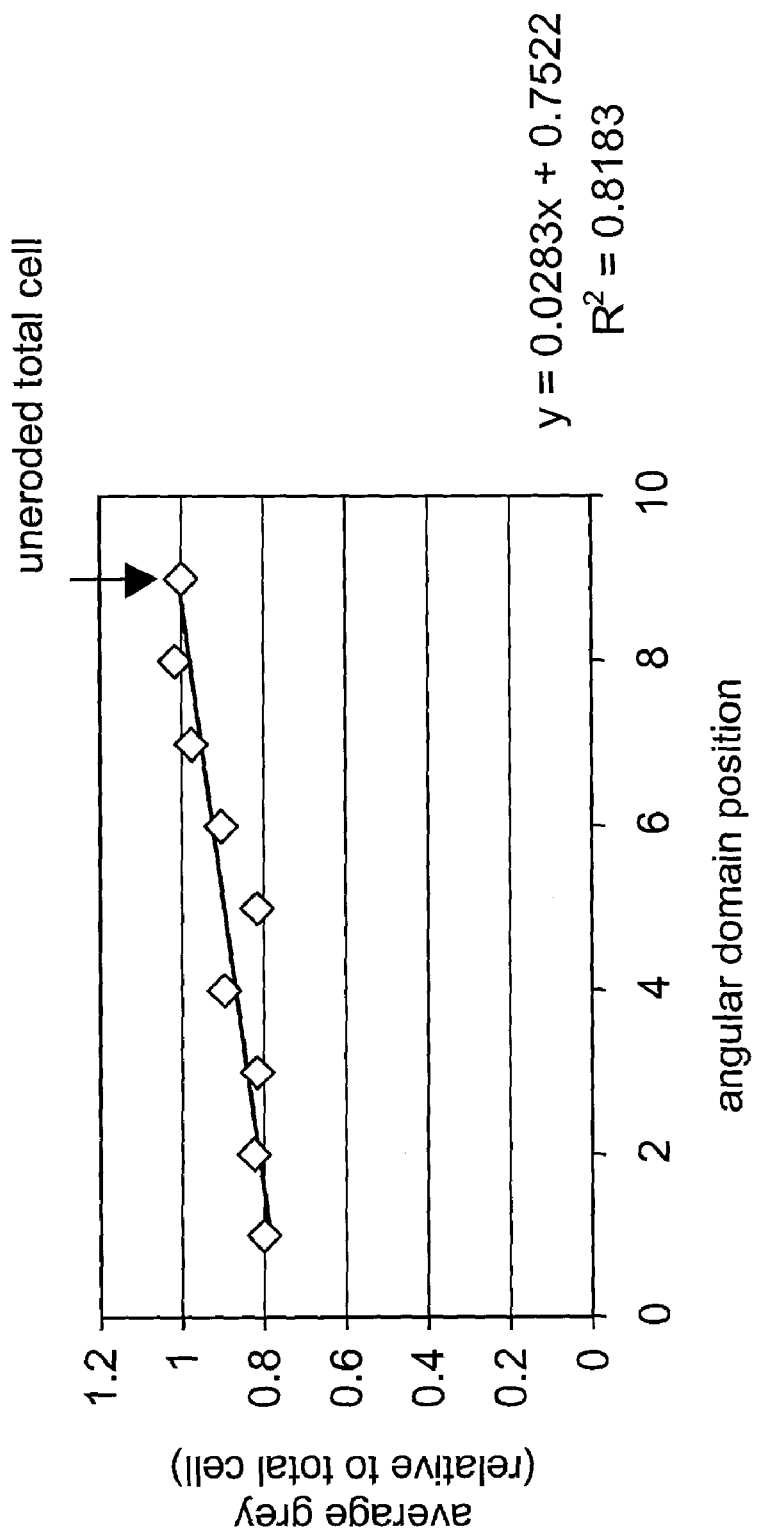
Figure 9:
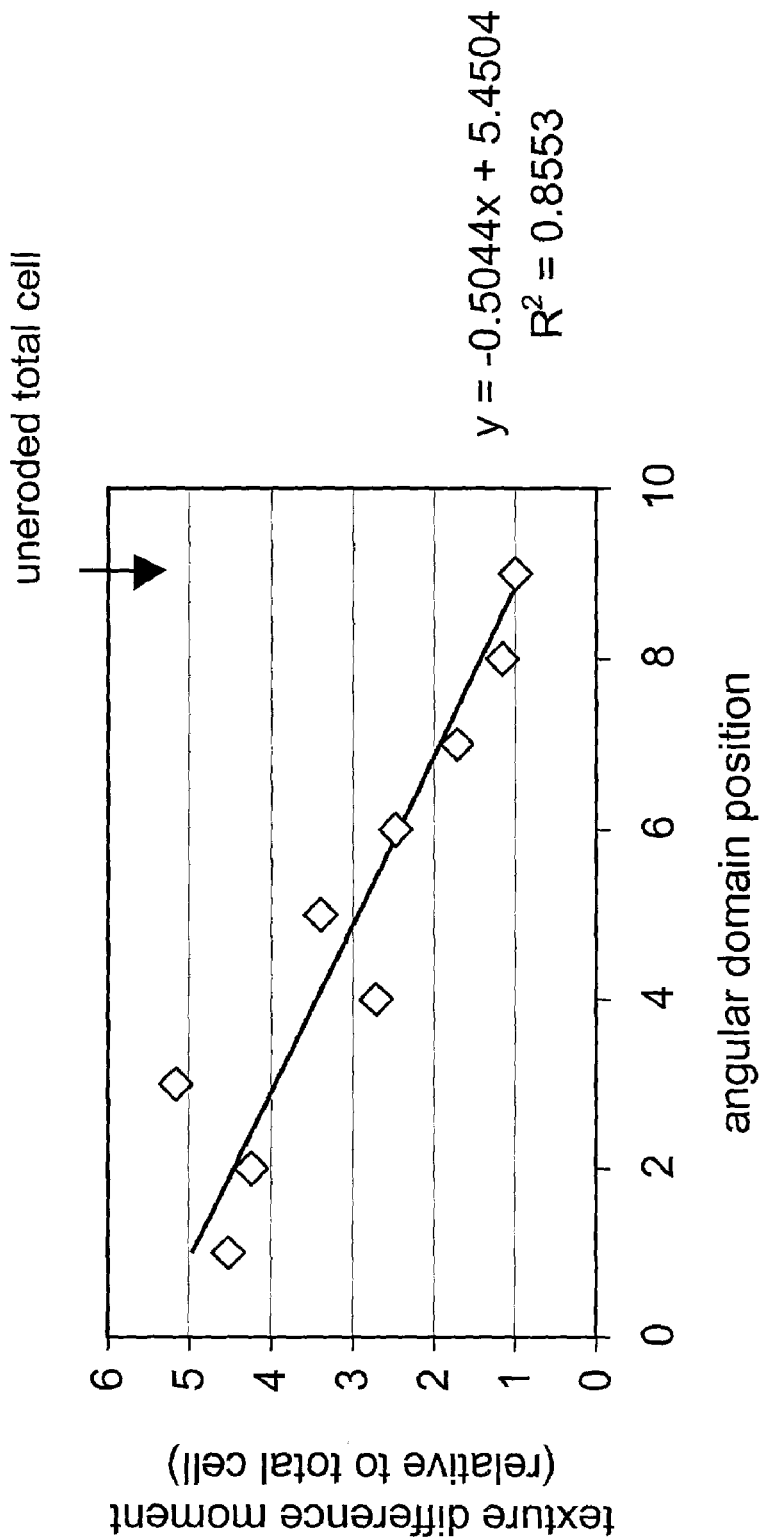
Figure 9:
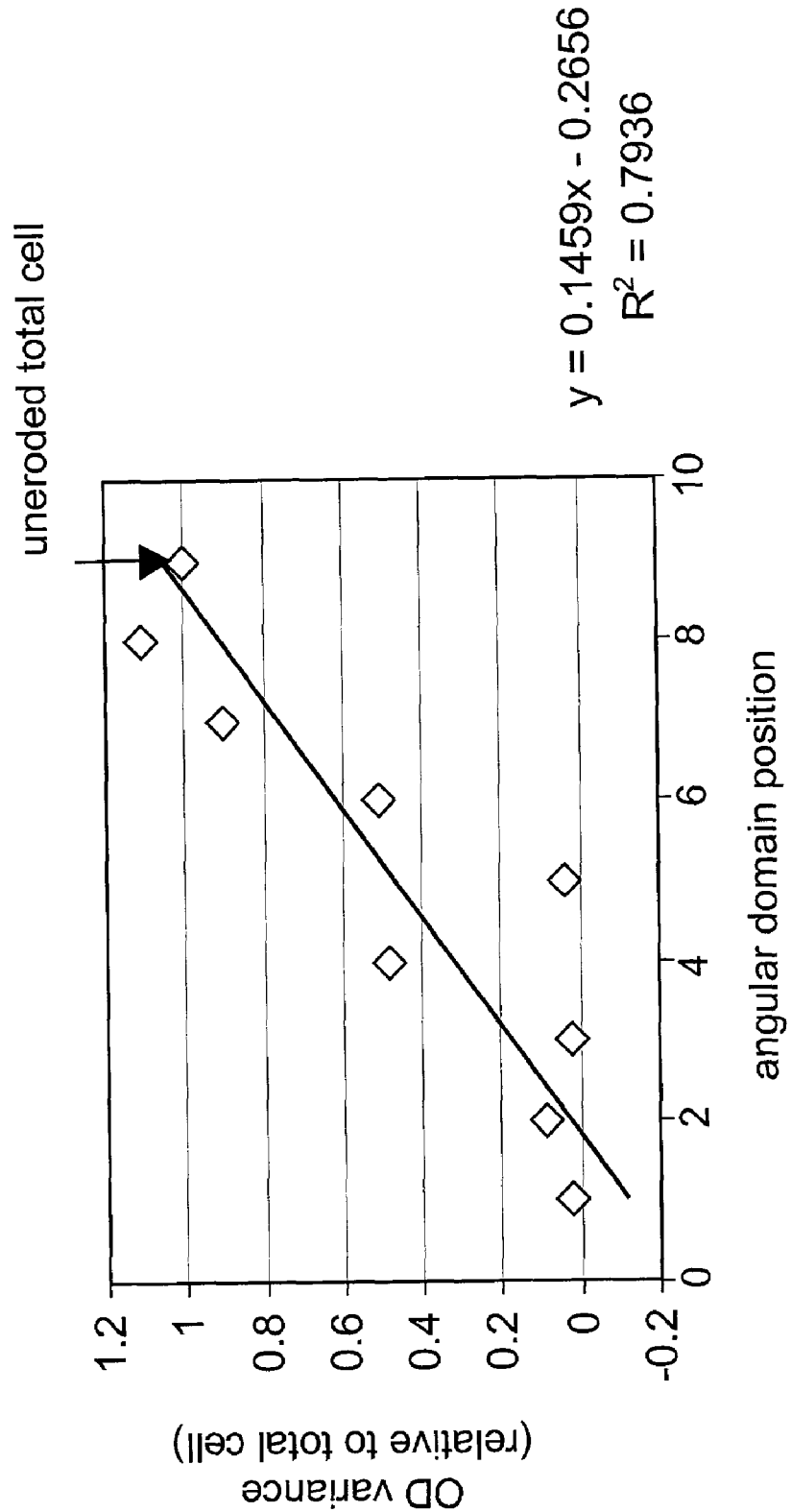

The spatial organization of intensity distribution within individual cells was then analyzed in an object of interest image, using annular domains (as in FIGS. 8D, F). The data are shown in FIG. 9 as graphs of tubulin distribution in a single control (9A-C) and a vinblastine-treated cell (9D-F). Annular domains were created by sequential dilations of the nuclear perimeter. The position of the domain furthest away from the nucleus was given a value of one, and domain position increases in number with nuclear proximity. For each plot, measurements of tubulin distribution were normalized, by dividing the measurement obtained in a particular domain by the measurement obtained in the domain that is immediately adjacent to the nucleus. Intensity distribution within each domain was analyzed using a mathematical function to calculate the following: (1) the average pixel intensity (a measure proportional to tubulin mass) (9A, D); (2) texture difference moment (a measure proportional to tubulin periodicity) (9B, E); and (3) OD variance (a measure proportional to tubulin clustering) (9C,F). To determine the trends within each cell, data points were fitted with a linear function. According to this analysis, the control cells showed an increase in tubulin staining towards the cell edge, as seen by the increase in intensity gray levels proportional to the distance from the cell nucleus (9A, negative slope). The vinblastine-treated cell showed the opposite trend (9B, positive slope). Both control and vinblastine treated cells showed a centrifugal increase in texture difference moment proportional to distance from the nucleus (9C, D), indicating a centrifugal increase in tubulin "periodicity". Lastly, the control cells showed little change in OD variance as a function of domain position (9E) while vinblastine treated cells showed a marked decrease (9F). Thus, the change in tubulin clustering (OD variance of intensities) as a function of domain position most dramatically reflected the difference of tubulin organization. For comparing cell populations under different treatment conditions, a number of cells in each condition can be analyzed as a sample, and the average slope within each sample used for statistical analysis.

A population analysis of the effect of various microtubule-targeting drugs on the spatial organization of tubulin was next performed, determined with annular domains. The data are plotted as bar graphs of mean tubulin fluorescence (FIG. 10A), mean standard deviation of tubulin fluorescence (FIG. 10B), nuclear normalized tubulin intensity (FIG. 10C), and normalized standard deviation of microtubule intensity (FIG. 10D). For the analysis, five perinuclear domains were created by sequential annular dilations of the nuclear perimeter. These domains were numbered consecutively one through five, one being the domain that is closest to the nucleus. Each bar represents the domain average for a sample of cells in each treatment condition (n>20). Normalized standard deviation was calculated by dividing the standard deviation of tubulin intensity by the mean tubulin intensity for that particular domain. Drug treatments, performed in duplicate, included paclitaxel, nocodazole, vinblastine, colchicine, DMSO and untreated controls. Analysis of mean tubulin fluorescence (10A), and of the nuc/cyto ratio (10B) indicated a decrease in tubulin staining as a function of distance from the nucleus for all the conditions tested. Analysis of standard deviation of mean tubulin fluorescence indicated differences in tubulin organization. Accordingly paclitaxel-treated cells appeared more similar to vinblastine-treated cells, nocodazole treated-cells were more similar to colchicine-treated cells, and DMSO-treated cells were more similar to untreated cells.

Figure 10:
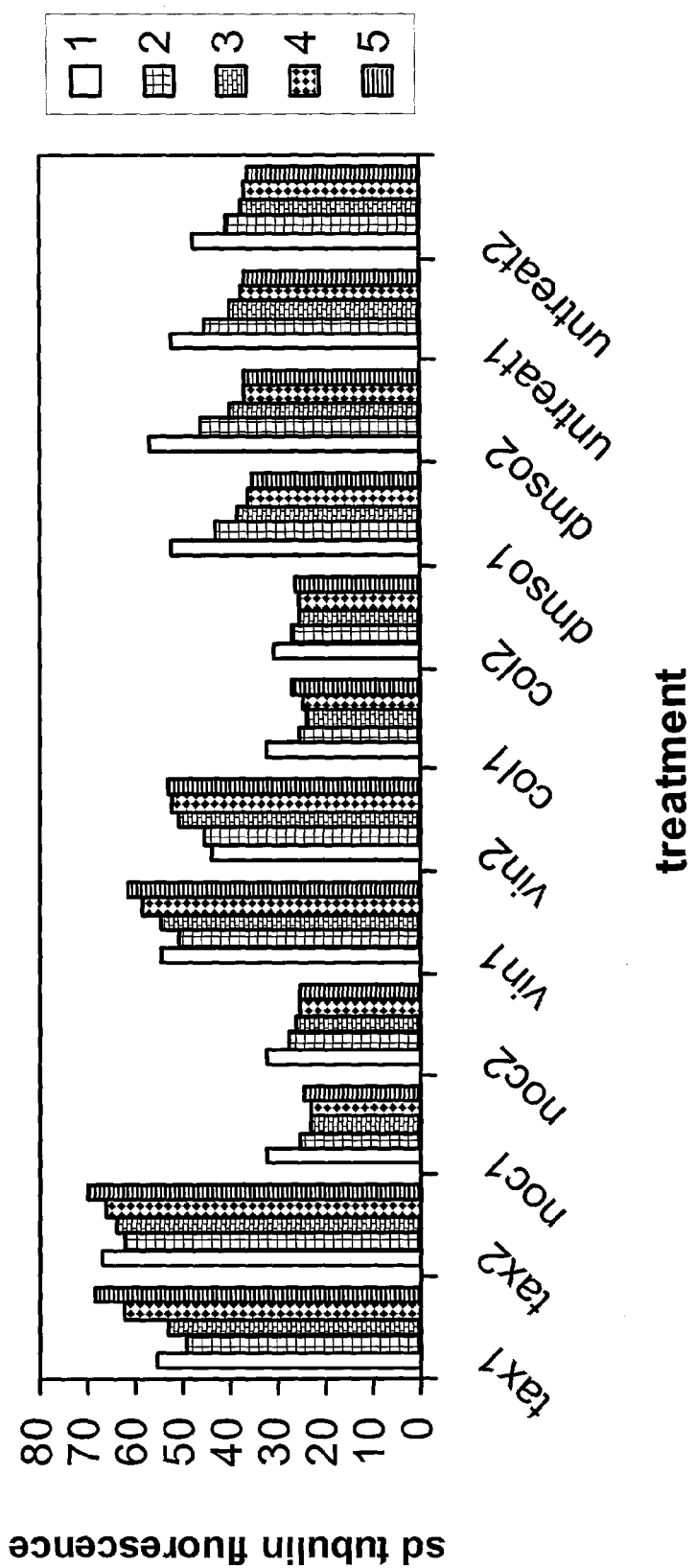
FIG. 10 A-D are graphs showing a population analysis of tubulin organization in individual cells in the presence of different treatments, determined using annular domains.
Figure 10:
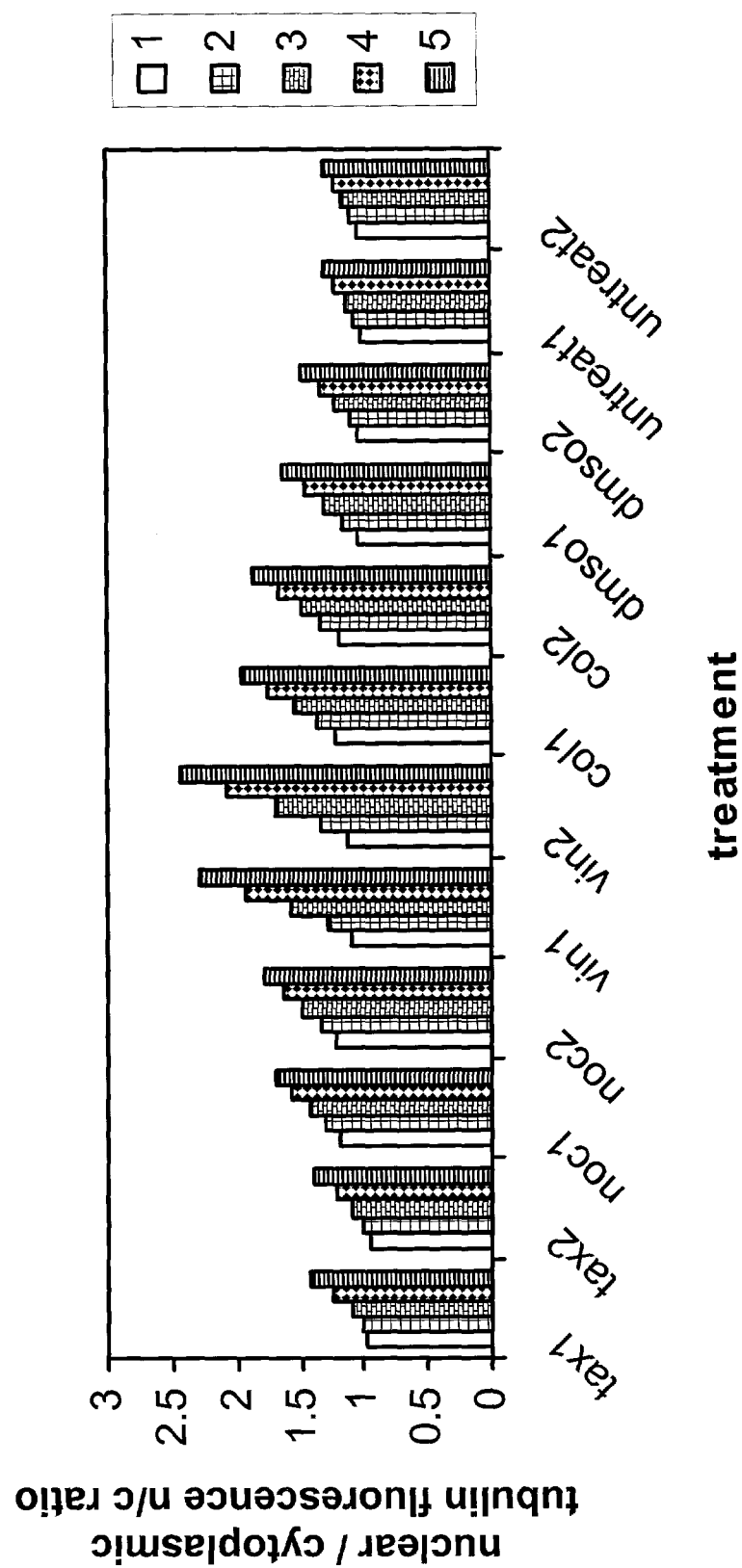
Figure 10:
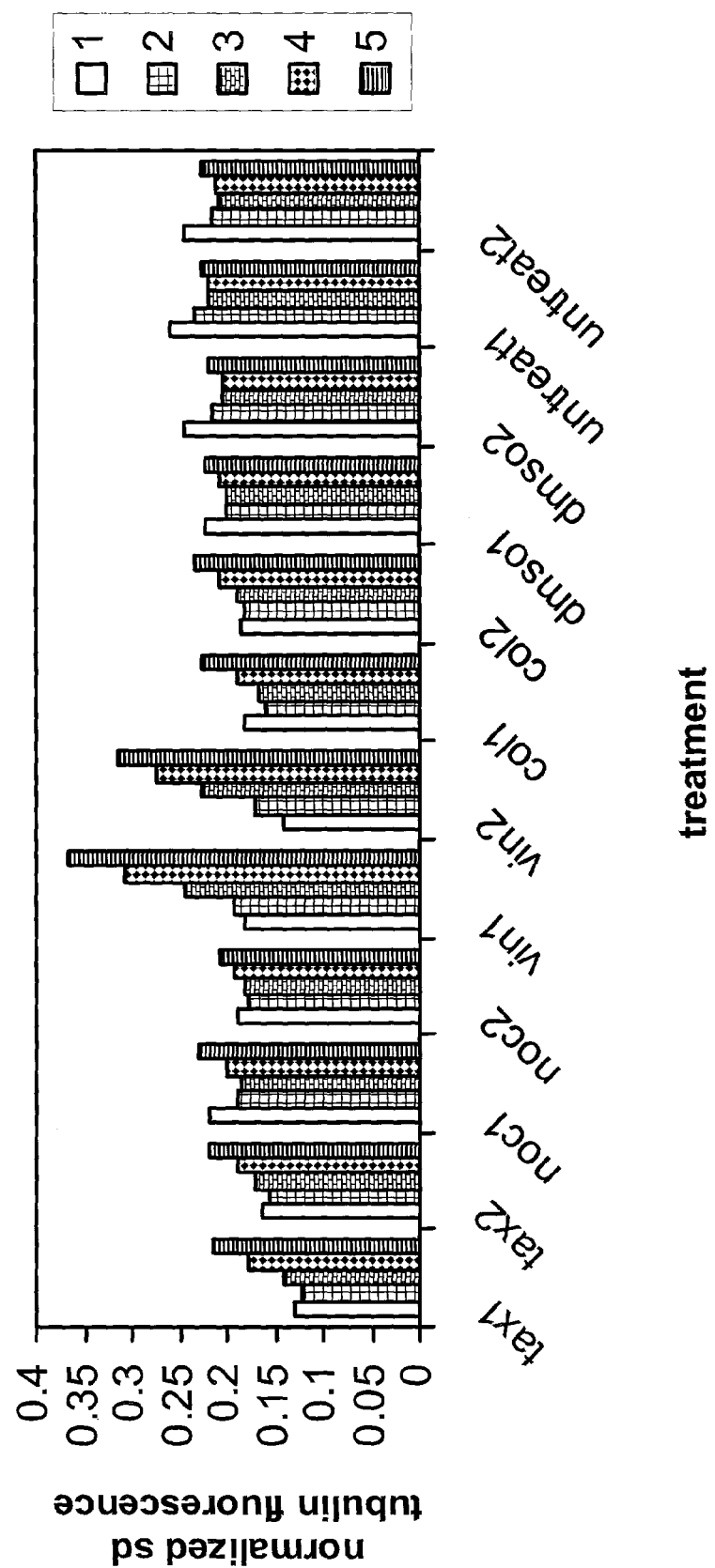
Figure 11:
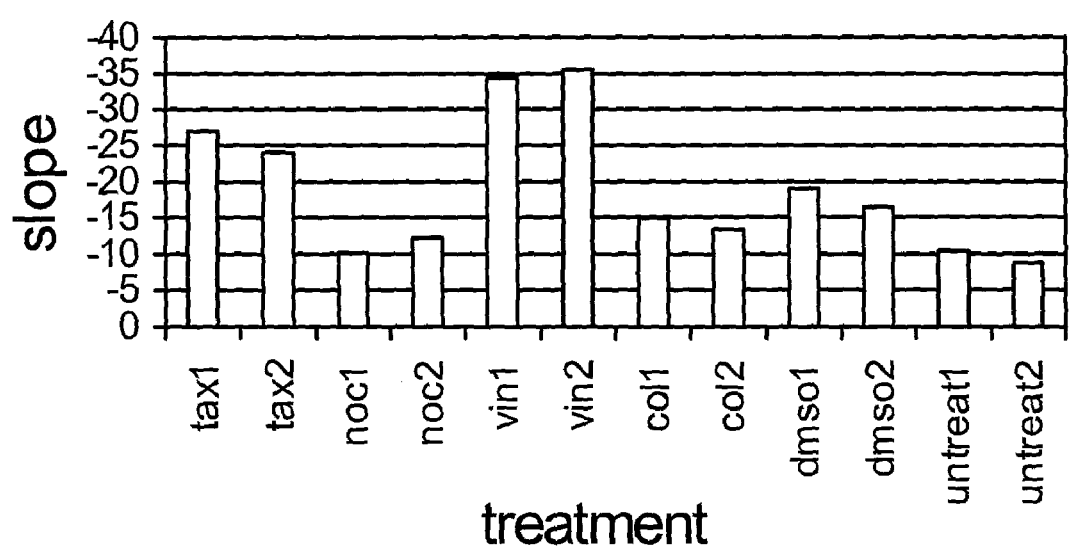
FIG. 11 A-D are graphs showing the spatial organization of tubulin-associated fluorescence in individual cells in the presence of different treatments.
Figure 11:
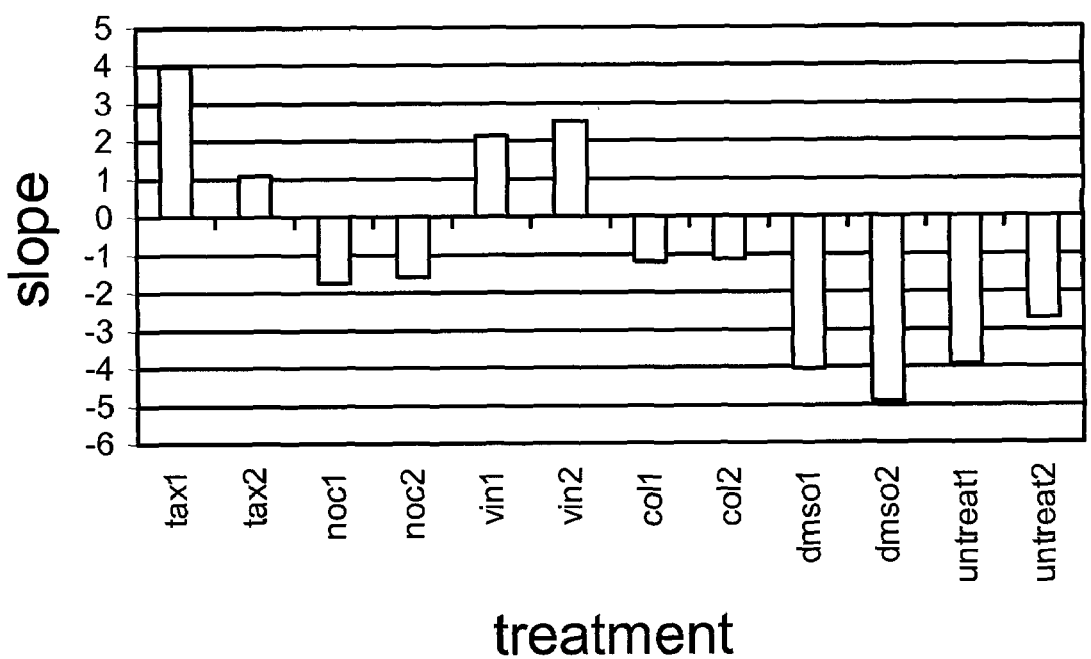
Figure 11:
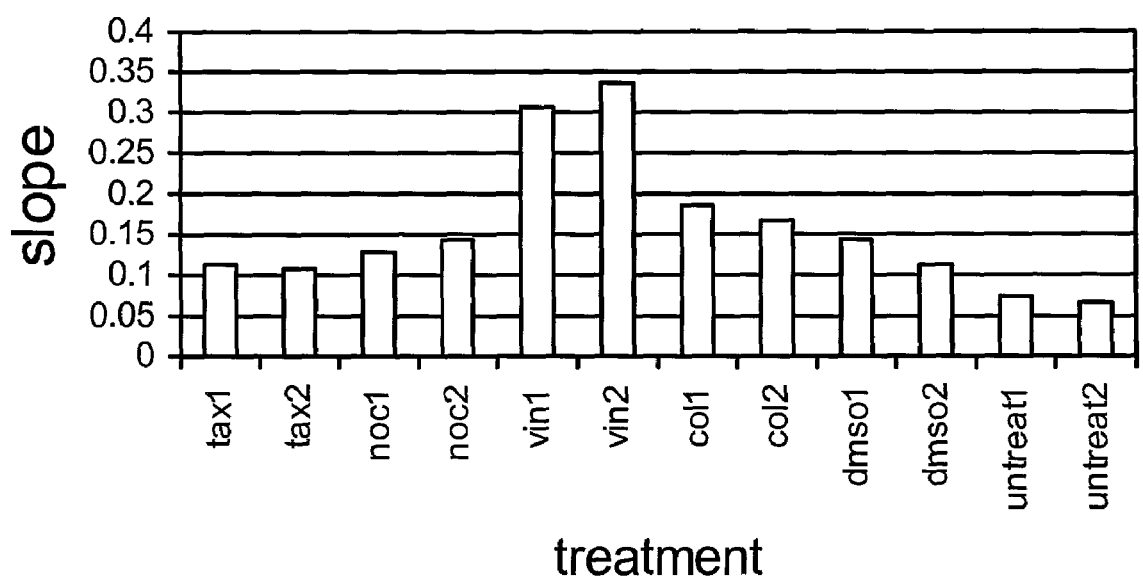
Figure 11:
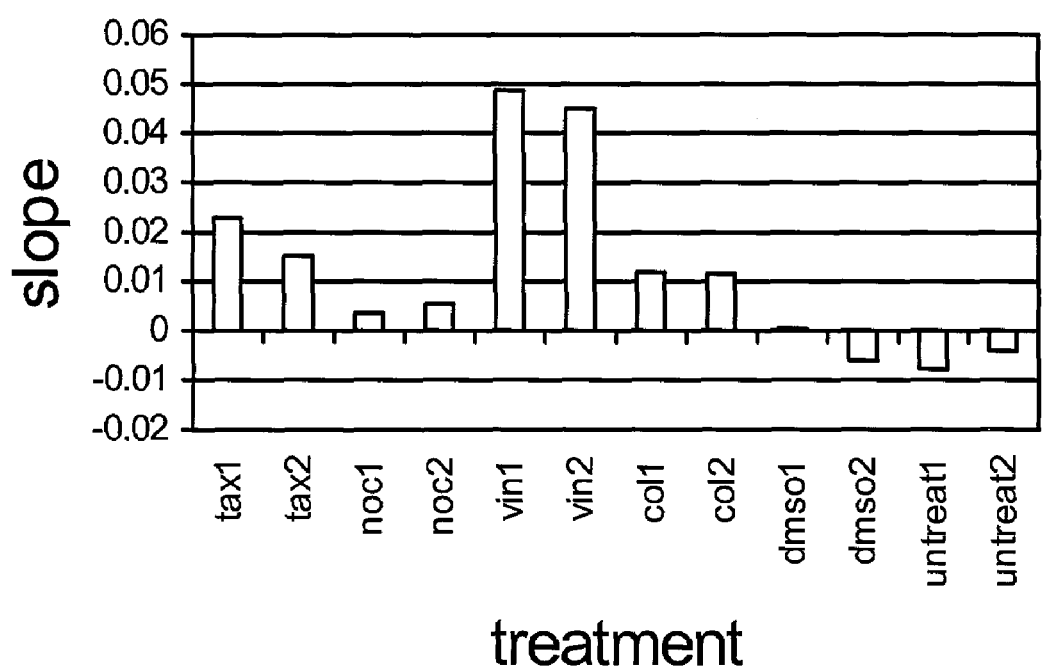

The data obtained in the experiments shown in FIG. 10 are summarized in FIG. 11, to analyze the spatial organization of tubulin in the presence of the different treatments. Data points for the sequential annular domains were fit with a line, and the slope of the line was used to summarize the spatial organization trend in each condition. Based on the slopes of mean tubulin fluorescence (11A), mean standard deviation of tubulin fluorescence (11B), nuclear-normalized tubulin intensity (11C), and normalized standard deviation of microtubule intensity (11D), each treatment condition exhibited a characteristic effect on the spatial organization of tubulin fluorescence relative to control (untreated) cells.

The effect of various treatments on angular tubulin organization, within a single perinuclear annular domain was next tested. Cells were either left untreated or treated with paclitaxel, nocodazole, or vinblastine. A single annular domain was generated around each nucleus, based on a single dilation of the nuclear perimeter. The annular domain was then divided into 24 angular domains, each angular domain covering 15 degrees of the nuclear circumference. Within each angular domain, two to four measurements of mean pixel intensities were made and averaged to determine the tubulin intensity within the domain. Data points were represented as the average pixel intensity in each angular domain, plotted against the radial angle, with each cell in the field represented by 360 degrees in the x axis of the graph, and domains numbered clockwise based on the angle of rotation, starting from the highest intensity value measured for each cell. Above threshold "peaks " in intensity distributions, determined relative to the median tubulin intensity for all the angular domains analyzed in the control cell population are identified as "spots" in the images, and represent areas where tubulin is concentrated. In our experiments, control cells had 3 spots on average, paclitaxel treated cells 4 spots, nocodazole-treated cells 2 spots, and vinblastine-treated cells has 3 spots.

Figure 12:
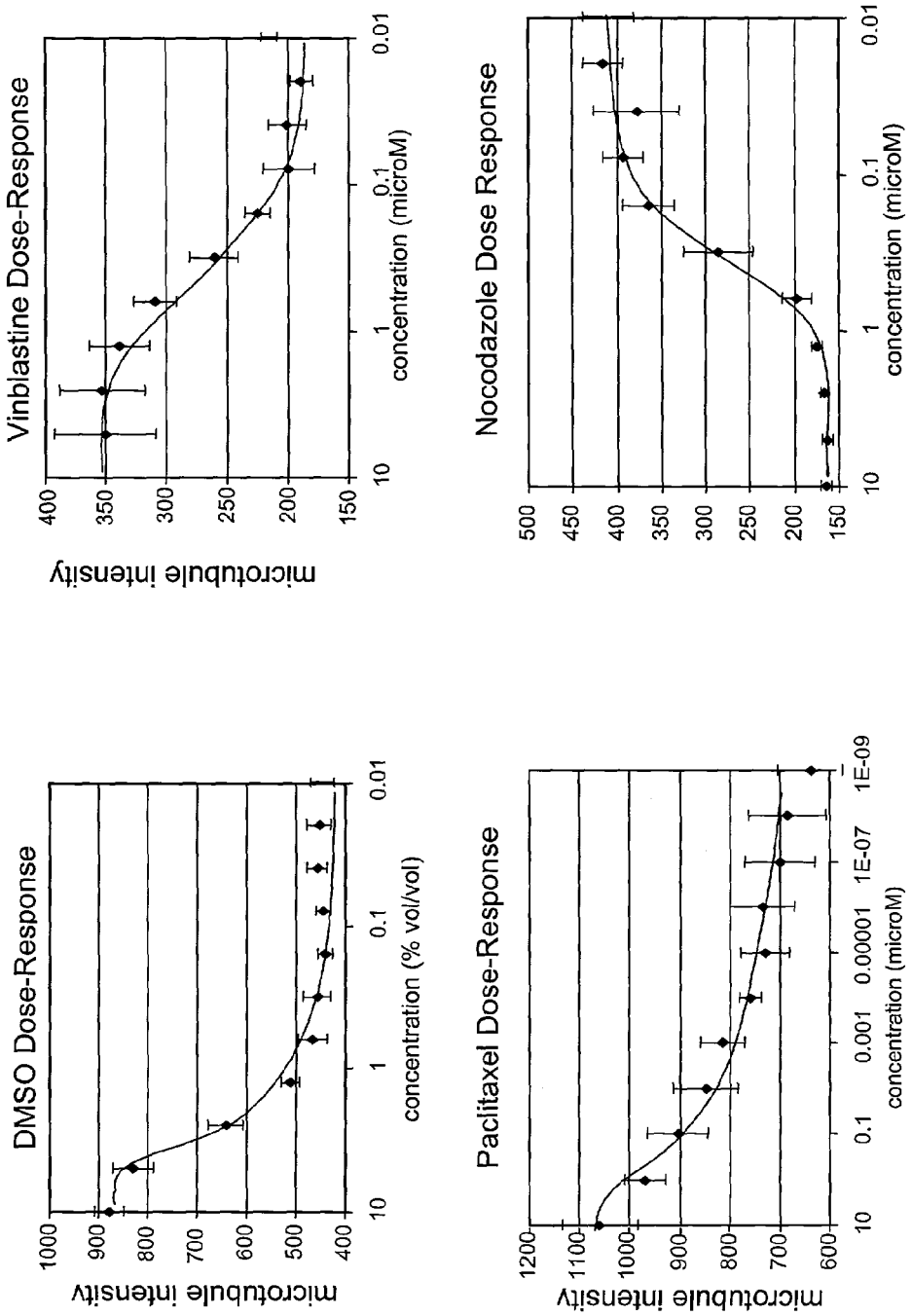
FIG. 12 is a series of graphs demonstrating the effect of various treatments on the temporal organization of microtubule intensity in different treatments within a single perinuclear annular domain, as a function of domain position (treatment dimension).

In another experiment, tubulin fluorescence intensity was analyzed with a single annular domain generated around each nucleus, based on a single dilation of the nuclear perimeter. FIG. 12 shows data on the spatial organization of microtubule intensity within a single annular domain, as a function of domain position (in the concentration dimension) on a 96 well microplate in response to different compounds. Since different wells on the plate had different inhibitor concentrations, domain position reflects the location of the domain measurements across the 96 well plate.

Figure 13:
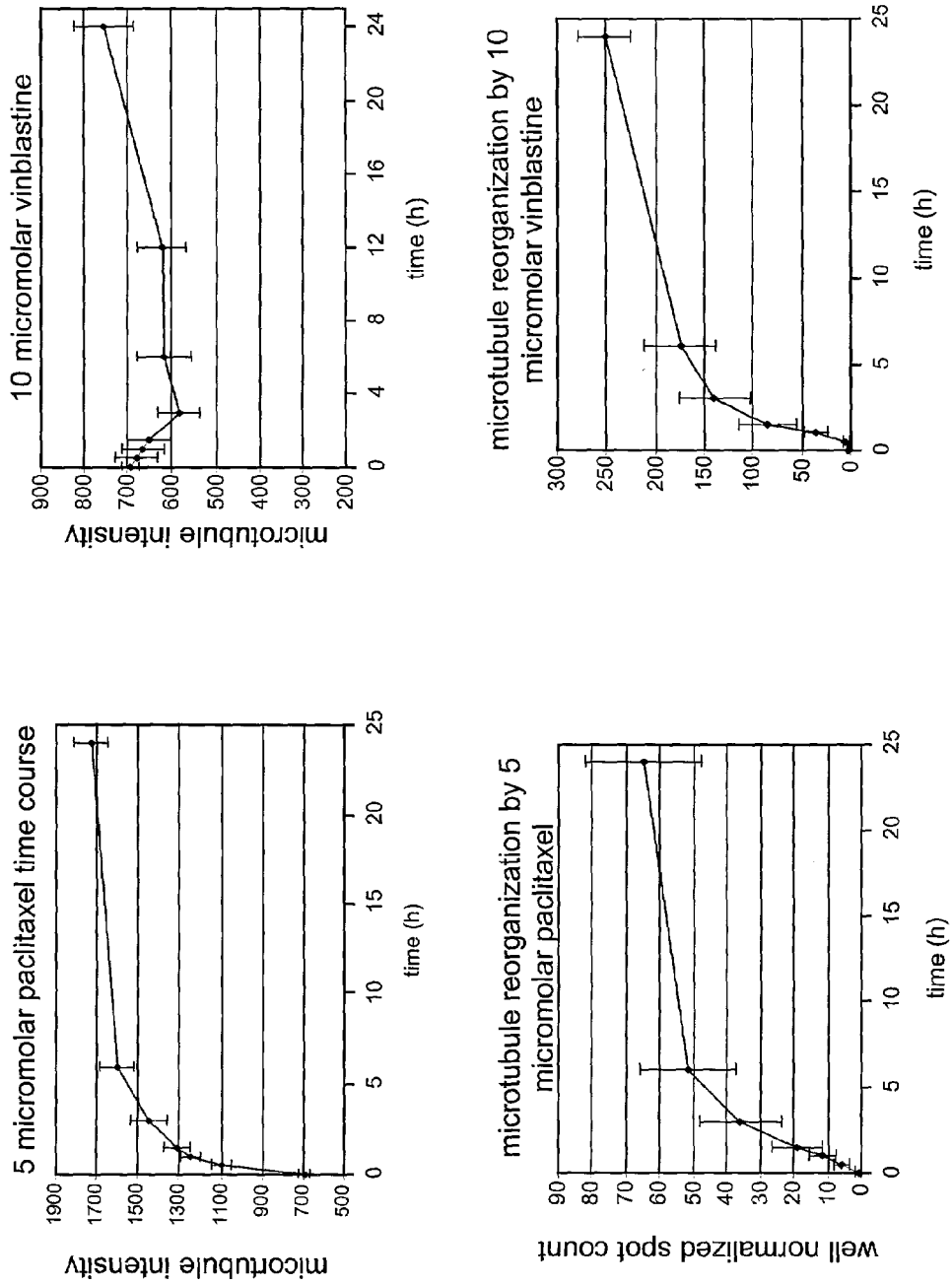
FIG. 13 is a series of graphs demonstrating the temporal organization of microtubule intensity and well normalized spot counts within a single perinuclear annular domain.

FIG. 13 is a representation of data on the spatial organization of microtubule intensity and well normalized spot counts within a single perinuclear annular domain, as a function of domain position (in the temporal dimension) on a 96 well plate. Spot counts were calculated by thresholding the microtubule image. For the time-course experiment, since different wells on the plate had a different inhibitor added at different times, domain position reflects the location of the domain measurements across the 96 well plate.

Figure 14:
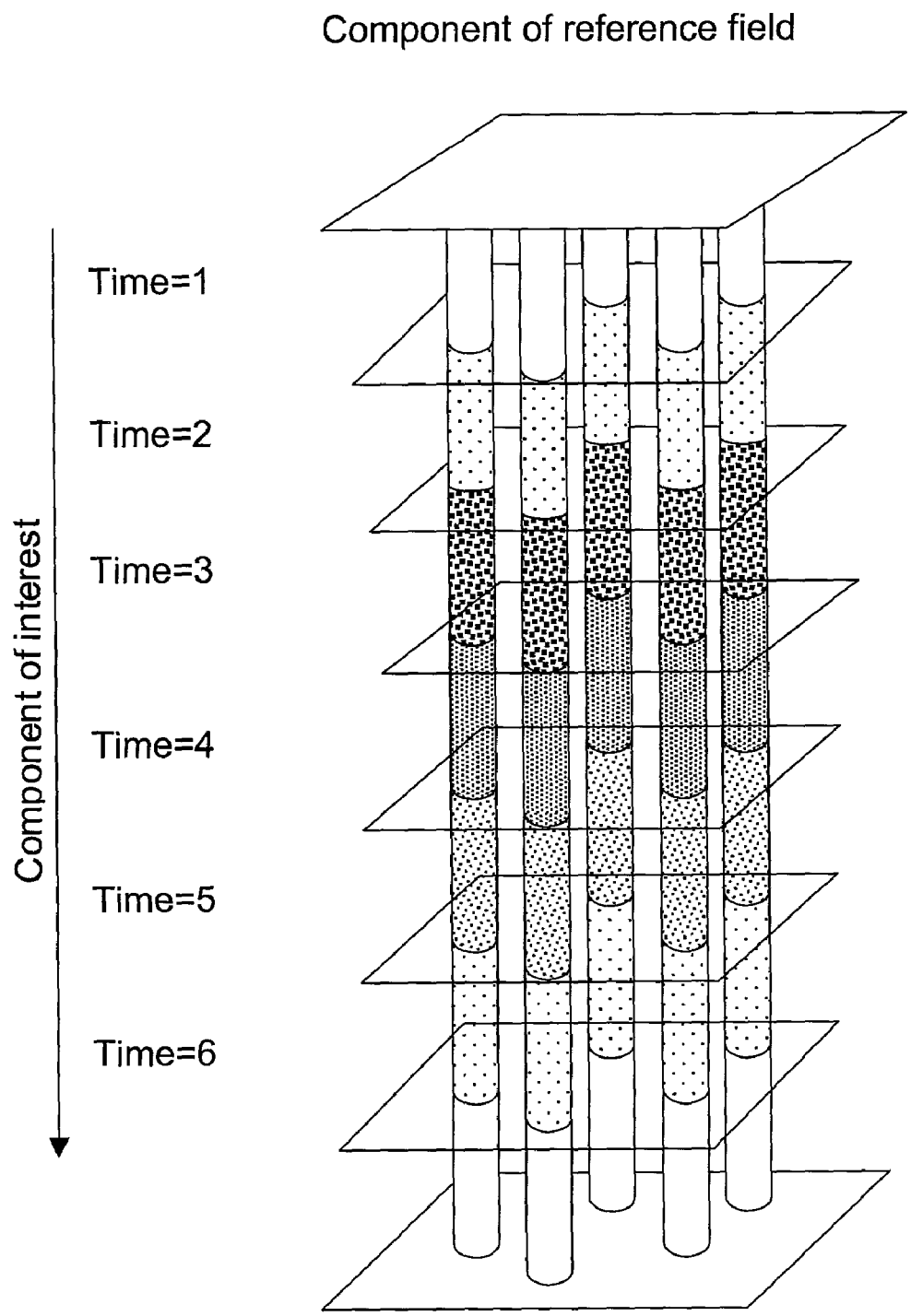
FIG. 14 is a representation of a method for analyzing the temporal organization of calcium-dependent fluorescent changes within cellular domains.

In a further experiment, cells were loaded with a calcium sensitive fluorescent reporter (cell component of interest) and a nuclear dye (cell reference component). A cell component of interest image was acquired approximately every two seconds, and a cell reference component image was acquired at the beginning and the end of the experiment. Using the cell reference component (nuclear) image, a cell reference component origin was identified in association with each individual cell in the field. The origin was used to identify the cell boundaries, and a single annular domain was generated encompassing the area enclosed by the nuclear perimeter. These domains were then used to measure average intensities of the cell reference component (fluorescent calcium biosensor) in individual cell images, at each individual time slice in the experiment. The temporal chain of events associated with each individual cell is represented as a set of transverse domains, stacked upon each other in the temporal direction (FIG. 14). In the absence of cell movement, the stacked temporal domains can be represented as latitudinally-sectioned cylinders in three dimensional space, similar to FIG. 6B. In the diagram, a cell object of reference image is acquired at the beginning and the end of the experiments, and is used to identify individual origins of reference in association with each cell, from which a single cellular domain is generated. Sequential image acquisition of the cell component of interest are represented as transverse slices across the temporal axis. Varying intensities of the cell component of interest are represented as different shades of gray.

The invention claimed is:

1. A computer readable storage medium comprising a set of instructions for causing a cell screening system to execute a set of procedures for determining organization of a component of interest in individual cells, comprising
    (a) obtaining from individual cells optically detectable signals from (i) at least a first optically detectable reference component reporter molecule in the individual cells that identifies a reference component; and (ii) at least a first optically detectable cellular component reporter molecule in the individual cells that identifies a cellular component of interest; wherein the cellular component of interest and the reference component are selected from the group consisting of microfilaments, intermediate filaments, microtubules, cytoskeletal components, mitochondria, Golgi apparatus, lysosomes, nuclei, endoplasmic reticulum, vacuoles, and plasma membranes; wherein the at least first optically detectable reference component reporter molecule and the at least first optically detectable cellular component reporter molecule are different, and wherein the cellular component of interest and the reference component are different;
    (b) automatically converting the optically detectable signals from the at least first optically detectable reference component reporter molecule into a digital reference component image;
    (c) automatically converting the optically detectable signals from the at least first optically detectable cellular component reporter molecule into a digital cellular component image;
    (d) automatically defining a reference component origin from the digital reference component image;
    (e) automatically defining a plurality of cellular domains relative to the reference component origin; and
    (f) automatically measuring from the digital cellular component image one or both of an amount or distribution of the cellular component of interest as a function of position in the plurality of cellular domains, wherein the measure indicates the organization of the cellular component of interest in the individual cells.

2. The computer readable storage medium of claim 1 wherein the reference component origin is selected from the group consisting of a single point, surface, polygon, or line defined relative to the reference component.

3. The computer readable storage medium of claim 2 wherein the reference component origin is a single point defined relative to the reference component, and wherein the computer readable storage medium provides instructions for causing the cell screening system to define the single point by a method selected from the group consisting of:
    A) determining an intersection of diagonals defined from corners of a bounding box around the reference component;
    B) determining an intersection of a longest and a shortest diagonal across the reference component;
    C) determining a center of mass of the reference component; and
    D) determining a centroid of the reference component.

4. The computer readable storage medium of claim 2 wherein the reference component origin is a surface or polygon defined relative to the reference component, and wherein the computer readable storage medium provides instructions for causing the cell screening system to define the surface or polygon by a method selected from the group consisting of:
   A) circumscribing the reference component with a box or closed curve;
   B) defining a perimeter of the reference component;
   C) determining a perimeter of a largest identifiable reference component object; and
   D) making sequential pixel erosions from the reference component.

5. The computer readable storage medium of claim 2 wherein the reference component origin is a line defined relative to the reference component, and wherein the computer readable storage medium provides instructions for causing the cell screening system to define the line by a method selected from the group consisting of:
   A) circumscribing the reference component within a box or closed curve and defining a line along a middle of the box as the reference component origin; and
   B) defining a longest diagonal along the reference component as the reference component origin.

6. The computer readable storage medium of claim 2 wherein the defining a plurality of cellular domains includes defining a cell boundary.

7. The computer readable storage medium of claim 6, wherein defining the cell boundary comprises a step selected from the group consisting of:
   A) thresholding the cellular component image;
   B) defining a line separating each individual cell reference component;
   C) defining a circle or polygon drawn at a certain distance from the cell reference component origin;
   D) dilating a perimeter of the reference component; and
   E) labeling cell membranes with a membrane stain and defining a concentric set of rings that fill space between a border of the reference component and the cell border.

8. The computer readable storage medium of claim 6, wherein the cellular domains consist of domains selected from the group consisting of annular domains, angular domains, and transverse domains.

9. The computer readable storage medium of claim 8 wherein the plurality of cellular domains comprise annular domains, and wherein a position of individual annular domains is defined according to a radial distance of the individual annular domains from the reference component origin.

10. The computer readable storage medium of claim 9 wherein the annular domains are of a shape selected from the group consisting of circular, irregular, and polygonal.

11. The computer readable storage medium of claim 10 wherein the annular domains are concentric annular domains, and wherein the concentric annular domains are defined by defining self similar circles, polygons or other closed shapes around the reference component origin.

12. The computer readable storage medium of claim 8 wherein the plurality of cellular domains comprise angular domains, and wherein a position of the angular domains is defined by an angular rotation of a line around the reference component origin or a point equidistant between two different reference component origins.

13. The computer readable storage medium of claim 12 wherein the angular domains are of a shape selected from the group consisting of regular wedges, irregular wedges, and polygons.

14. The computer readable storage medium of claim 8, wherein the plurality of cellular domains comprise transverse domains, wherein the transverse domains are stacked in a direction defined by a line or axis.

15. The computer readable storage medium of claim 14 wherein domain position is defined by a sequential order of the cellular domains along the line or axis.

16. The computer readable storage medium of claim 15 wherein the transverse domains are of a shape selected from the group consisting of polygonal, curved, and straight.

17. The computer readable storage medium of claim 16, wherein the transverse domains define a coordinate system.

18. The computer readable storage medium of claim 17 wherein the transverse domains are polarized.

19. The computer readable storage medium of claim 8, wherein the plurality of cellular domains comprise a combination of annular, angular, and transverse domains.

20. The computer readable storage medium of claim 8 wherein the measure indicates the spatial organization of the cellular component of interest in the individual cells.

21. The computer readable storage medium of claim 8 wherein the measure indicates the temporal organization of the cellular component of interest in the individual cells.

22. The computer readable storage medium of claim 8 wherein an amount of the cellular component of interest within the plurality of cellular domains is measured, and wherein the amount of the cellular component comprises one or more parameters selected from the group consisting of mass, concentration, intensity, number of objects, length, size, area, and density.

23. The computer readable storage medium of claim 8 wherein a distribution of the cellular component of interest within the plurality of cellular domains is measured, and wherein the distribution of the cellular component comprises one or more parameters selected from the group consisting of statistical distribution and quality distribution.

24. The computer readable storage medium of claim 23 wherein the parameter is statistical distribution, and wherein statistical distribution comprises one or more features selected from the group consisting of mean amount per unit area, standard deviation in amount per unit area, skewness, and kurtosis.

25. The computer readable storage medium of claim 23 wherein the parameter is quality distribution, and wherein the quality distribution comprises one or more features selected from the group consisting of heterogeneity, homogeneity, linearity, randomness, gradient, directionality, orientation, polarization, aggregation, clustering, texture, and periodicity.

26. The computer readable storage medium of claim 8, wherein the organization of the cellular component of interest in the individual cells is defined as an intracellular gradient of the cellular component present in the plurality of cellular domains.

27. The computer readable storage medium of claim 8, wherein the organization of the cellular component of interest in the individual cells is defined as an intracellular gradient of the rate of change of the cellular component present in the plurality of cellular domains, wherein the rate of change is determined as a function of one or more of domain position, time, and experimental conditions.

28. The computer readable storage medium of claim 8, wherein the organization is determined in three dimensions.

29. The computer readable storage medium of claim 28, wherein the cells are cross-sectioned longitudinally, and each cross section is divided into a plurality of cellular domains.

30. The computer readable storage medium of claim 29, wherein the organization of the cellular component is determined in three dimensions as a function of both domain position and longitudinal angle of rotation.

31. The computer readable storage medium of claim 28, wherein the cells are cross-sectioned latitudinally, and each cross section is divided into a plurality of cellular domains.

32. The computer readable storage medium of claim 31, wherein the organization of the cellular component is determined in three dimensions as a function of both domain position and latitudinal distance.

33. The computer readable storage medium of claim 28, wherein the cells are segmented into nested shells or cylinders.

34. The computer readable storage medium of claim 33, wherein the organization of the cellular component is determined as a function of angular position in the nested shells or cylinders.

35. The computer readable storage medium of claim 8, wherein the reference component is a nucleus.

36. The computer readable storage medium of claim 35, wherein the reference component origin is a nuclear perimeter.

37. The computer readable storage medium of claim 36, wherein defining the cellular domains comprises defining a perinuclear region around the nuclear perimeter.

38. The computer readable storage medium of claim 35, wherein the cellular component of interest is selected from the group consisting of microfilaments, intermediate filaments, and organelles.

39. The computer readable storage medium of claim 38 wherein the cellular component of interest is a microtubule polymer.

40. The computer readable storage medium of claim 26, wherein the reference component is the nucleus, and wherein the computer readable storage medium provides instructions for causing the cell screening system to:
   A) generate a series longitudinal or latitudinal cross-section images of the cells;
   B) generate a perinuclear shell by thresholding the longitudinal or latitudinal cross-section images at each longitudinal or latitudinal plane;
   C) construct a nuclear mask at each longitudinal or latitudinal plane based on the thresholded images;
   D) define a perinuclear ring mask from the nuclear mask at each longitudinal or latitudinal plane;
   E) stack the perinuclear ring masks at each longitudinal or latitudinal plane to define a three-dimensional perinuclear shell; and
   F) sequentially expand the three dimensional perinuclear shell.

41. The computer readable storage medium of claim 8 wherein the measurements comprise statistical analyses of cell-based measurements for a field or a well or a multi-well plate of cells being analyzed.

42. The computer readable storage medium of claim 8, wherein the computer readable storage medium further provides instructions for causing the cell screening system to measure changes in the organization of the cellular component reporter molecules in the cells in response to test stimuli, to demonstrate an effect of the test stimuli on the organization of the cellular component of interest.

* * * * *